US012591796B2

(12) United States Patent
Viale et al.

(10) Patent No.: US 12,591,796 B2
(45) Date of Patent: Mar. 31, 2026

(54) INTELLIGENT DISTANCE PROMPTING

(71) Applicant: International Business Machines Corporation, Armonk, NY (US)

(72) Inventors: Joel Viale, Vence (FR); Frederic Bauchot, La Tourraque (FR); Zsolt Szalai, Tourrettes-sur-Loup (FR); Georges-Henri Moll, Roquefort les Pins (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 893 days.

(21) Appl. No.: 17/249,028

(22) Filed: Feb. 17, 2021

(65) Prior Publication Data

US 2022/0261672 A1     Aug. 18, 2022

(51) Int. Cl.
   G06N 7/01        (2023.01)
   G06N 5/01        (2023.01)
   G06N 20/20       (2019.01)

(52) U.S. Cl.
   CPC ................. G06N 7/01 (2023.01); G06N 5/01 (2023.01); G06N 20/20 (2019.01)

(58) Field of Classification Search
   CPC . G06N 7/01; G06N 5/01; G01C 21/00; G01C 21/3617; G01C 21/383
   See application file for complete search history.

(56) References Cited

U.S. PATENT DOCUMENTS

| | | | |
|---|---|---|---|
| 10,055,967 B1 | 8/2018 | Fields et al. | |
| 10,262,331 B1 * | 4/2019 | Sharma ................. | H04W 4/029 |
| 11,022,453 B2 | 6/2021 | Duquene et al. | |
| 2011/0184605 A1 * | 7/2011 | Neff ..................... | G05D 1/0231 |
| | | | 701/25 |

(Continued)

OTHER PUBLICATIONS

Lee et al., "Exploring the Usefulness of a Decision Tree in Predicting People's Locations," 2014, Procedia—Social and Behavioral Sciences. 140. 10.1016/j.sbspro.2014.04.451 (Year: 2014).*

(Continued)

*Primary Examiner* — Michael J Huntley
*Assistant Examiner* — Vincent Anton Spraul
(74) *Attorney, Agent, or Firm* — Aaron Pontikos, Esq.; Heslin Rothenberg Farley & Mesiti P.C.; George S. Blasiak, Esq.

(57)           ABSTRACT

Methods, computer program products, and systems are presented. The method computer program products, and systems can include, for instance: examining location data that specifies respective locations of a plurality of users in a venue, wherein the plurality of users include first through Nth users within the venue, wherein the first through Nth users include at least a first user and a second user; examining an item acquisition list for the first user, wherein the item acquisition list specifies items for acquisition by the first user that are distributed into different locations of the venue; generating a plurality of candidate routes for the first user commencing from a current location of the first user, wherein the plurality of candidate routes include one or more candidate route commencing from the current location of the first user to a first item referred on the item acquisition list.

17 Claims, 14 Drawing Sheets

(56)          References Cited

U.S. PATENT DOCUMENTS

| | | | | |
|---|---|---|---|---|
| 2014/0303885 | A1 | 10/2014 | Kamada et al. | |
| 2015/0269491 | A1* | 9/2015 | Tripathi | G08G 1/0129 |
| | | | | 706/46 |
| 2016/0063610 | A1* | 3/2016 | Argue | G06Q 30/0633 |
| | | | | 705/26.8 |
| 2016/0100301 | A1* | 4/2016 | Gaurav | H04W 4/023 |
| | | | | 455/404.2 |
| 2016/0133127 | A1* | 5/2016 | Smereka | G08G 1/0141 |
| | | | | 701/118 |
| 2016/0345137 | A1* | 11/2016 | Ruiz | H04W 4/024 |
| 2018/0040037 | A1 | 2/2018 | Blair, II | |
| 2018/0040038 | A1* | 2/2018 | Vanslette | H04W 4/02 |
| 2021/0318683 | A1* | 10/2021 | Luo | G01C 21/3407 |
| 2022/0011779 | A1* | 1/2022 | Kim | G06T 7/74 |
| 2022/0404155 | A1* | 12/2022 | Hausmann | G01C 21/3629 |

OTHER PUBLICATIONS

Hendawi et al., "Predictive Tree: An Efficient Index for Predictive Queries on Road Networks," 2015, IEEE 31st International Conference on Data Engineering (Year: 2015).*

Maiti et al., "Historical Data based Real Time Prediction of Vehicle Arrival Time," 2014 IEEE 17th International Conference on Intelligent Transportation Systems (ITSC) (Year: 2014).*

Anonymous "*System and Method to Establish Security Walking Paths in a Epidemic Period*" IP.Com—IPCOM000263604D, Sep. 17, 2020.

Anonymous "*Method and System for Smart Contract Enabled Enforcement of Social Distancing in a Retail Store*" IP.Com—IPCOM000263850D, Oct. 9, 2020.

Anonymous "*Cognitive Route Determination for Pandemic-Contamination Avoidance*" IP.Com—IPCOM000262686D, Jun. 19, 2020.

Biswas, Debolina "*This Startup's Personal Safety App Will Help you Maintain Social Distancing During CoronaVirus*" YourStory Media, Pvt. Ltd.; May 9, 2020.

List of IBM Patent and/or Patent Applications treated as related for U.S. Appl. No. 17/249,031, filed Feb. 17, 2021, dated Nov. 28, 2022.

StopCovid app: five questions to understand the digital tracing app; Franceinfo (France Televisions) May 26, 2020; 7 pages.

Holmes, Aaron; Singapore is using a high-tech surveillance app to trace the coronavirus, keeping schools and businesses open. Here's how it works; Business Insider; Mar. 24, 2020; 10 pages.

Global Dossier Report to U.S. Appl. No. 17/249,031; dated Jul. 21, 2023; 1 page.

Global Dossier Report to U.S. Appl. No. 17/249,028; dated Jul. 24, 2023; 1 page.

USPTO First Action Prediction Letter for U.S. Appl. No. 17/249,028; dated Jul. 21, 2023; 1 page.

Anonymous, "*Social Policy Identification and Behavior Conformity Awareness Rating*" IP.Com—IPCOM000263932D, Oct. 22, 2020.

Thakker, "*Smart Carts Get a Charge from Amazon and COVID-19*" Grocery Dive, https://www.grocerydive.com/news/smart-carts-get-a-charge-from-amazon-and-covid-19/583959/, Oct. 29, 2020.

Schouw, "*Go to Work, but Keep your Distance*" SoftwareAG.com., https://blog.softwareag.com/go-to-work-but-keep-your-distance, Oct. 29, 2020.

* cited by examiner

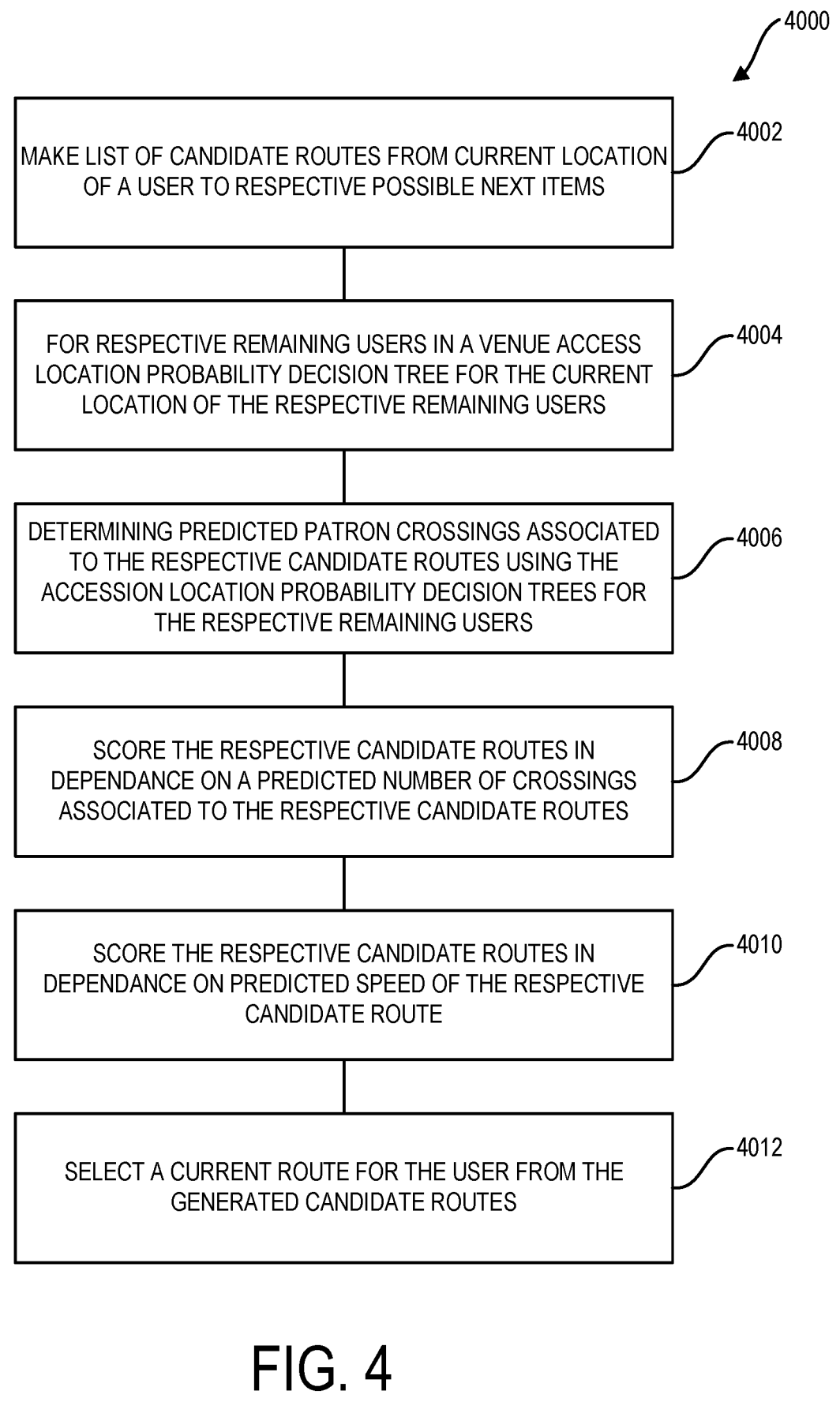

4000

MAKE LIST OF CANDIDATE ROUTES FROM CURRENT LOCATION OF A USER TO RESPECTIVE POSSIBLE NEXT ITEMS — 4002

FOR RESPECTIVE REMAINING USERS IN A VENUE ACCESS LOCATION PROBABILITY DECISION TREE FOR THE CURRENT LOCATION OF THE RESPECTIVE REMAINING USERS — 4004

DETERMINING PREDICTED PATRON CROSSINGS ASSOCIATED TO THE RESPECTIVE CANDIDATE ROUTES USING THE ACCESSION LOCATION PROBABILITY DECISION TREES FOR THE RESPECTIVE REMAINING USERS — 4006

SCORE THE RESPECTIVE CANDIDATE ROUTES IN DEPENDANCE ON A PREDICTED NUMBER OF CROSSINGS ASSOCIATED TO THE RESPECTIVE CANDIDATE ROUTES — 4008

SCORE THE RESPECTIVE CANDIDATE ROUTES IN DEPENDANCE ON PREDICTED SPEED OF THE RESPECTIVE CANDIDATE ROUTE — 4010

SELECT A CURRENT ROUTE FOR THE USER FROM THE GENERATED CANDIDATE ROUTES — 4012

FIG. 4

INTELLIGENT DISTANCE PROMPTING

BACKGROUND

Location based services (LBS) are software services that use location data to control functionality of computer systems' LBS information services and have a number of uses, e.g., in social networking, entertainment, security, and in a plurality of additional applications. LBS services employ location services for locating mobile computer systems. Location services can incorporate a variety of different locating service technologies such as the Global Positioning System (GPS), cellular network locating technologies, WI-FI based locating technologies, and other technologies. One example of an LBS is a location based messaging service wherein notifications and other messages to users can be in dependence on the respective locations of the users.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining location data that specifies respective locations of a plurality of users in a venue, wherein the plurality of users include first through Nth users within the venue, wherein the first through Nth users include at least a first user and a second user; examining an item acquisition list for the first user, wherein the item acquisition list specifies items for acquisition by the first user that are distributed into different locations of the venue; generating a plurality of candidate routes for the first user commencing from a current location of the first user, wherein the plurality of candidate routes include one or more candidate route commencing from the current location of the first user to a first item referred on the item acquisition list, and one or more candidate route commencing from the current location of the first user to a second item referred on the item acquisition list; evaluating respective ones of the plurality candidate routes using multiple factors, wherein the multiple factors include a crossing avoidance factor and a speed factor, the crossing avoidance factor, for a respective candidate route of the plurality of candidate routes, being in dependence on a predicted likelihood of the first user crossing one or more user of second to Nth users of the first though Nth users while traveling the respective candidate route, the speed factor being in dependence on a predicted speed of the first user in traveling the respective candidate route; selecting one of the plurality of candidate routes as the current route of the first user in dependence on the evaluating; and prompting the first user to travel the current route selected by the selecting.

In another aspect, a computer program product can be provided. The computer program product can include a computer readable storage medium readable by one or more processing circuit and storing instructions for execution by one or more processor for performing a method. The method can include, for example: examining location data that specifies respective locations of a plurality of users in a venue, wherein the plurality of users include first through Nth users within the venue, wherein the first through Nth users include at least a first user and a second user; examining an item acquisition list for the first user, wherein the item acquisition list specifies items for acquisition by the first user that are distributed into different locations of the venue; generating a plurality of candidate routes for the first user commencing from a current location of the first user, wherein the plurality of candidate routes include one or more candidate route commencing from the current location of the first user to a first item referred on the item acquisition list, and one or more candidate route commencing from the current location of the first user to a second item referred on the item acquisition list; evaluating respective ones of the plurality candidate routes using multiple factors, wherein the multiple factors include a crossing avoidance factor and a speed factor, the crossing avoidance factor, for a respective candidate route of the plurality of candidate routes, being in dependence on a predicted likelihood of the first user crossing one or more user of second to Nth users of the first though Nth users while traveling the respective candidate route, the speed factor being in dependence on a predicted speed of the first user in traveling the respective candidate route; selecting one of the plurality of candidate routes as the current route of the first user in dependence on the evaluating; and prompting the first user to travel the current route selected by the selecting.

In a further aspect, a system can be provided. The system can include, for example a memory. In addition, the system can include one or more processor in communication with the memory. Further, the system can include program instructions executable by the one or more processor via the memory to perform a method. The method can include, for example: examining location data that specifies respective locations of a plurality of users in a venue, wherein the plurality of users include first through Nth users within the venue, wherein the first through Nth users include at least a first user and a second user; examining an item acquisition list for the first user, wherein the item acquisition list specifies items for acquisition by the first user that are distributed into different locations of the venue; generating a plurality of candidate routes for the first user commencing from a current location of the first user, wherein the plurality of candidate routes include one or more candidate route commencing from the current location of the first user to a first item referred on the item acquisition list, and one or more candidate route commencing from the current location of the first user to a second item referred on the item acquisition list; evaluating respective ones of the plurality candidate routes using multiple factors, wherein the multiple factors include a crossing avoidance factor and a speed factor, the crossing avoidance factor, for a respective candidate route of the plurality of candidate routes, being in dependence on a predicted likelihood of the first user crossing one or more user of second to Nth users of the first though Nth users while traveling the respective candidate route, the speed factor being in dependence on a predicted speed of the first user in traveling the respective candidate route; selecting one of the plurality of candidate routes as the current route of the first user in dependence on the evaluating; and prompting the first user to travel the current route selected by the selecting.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 is a flowchart illustrating a method for performance by a manager system according to one embodiment;

DETAILED DESCRIPTION

Figure 1:
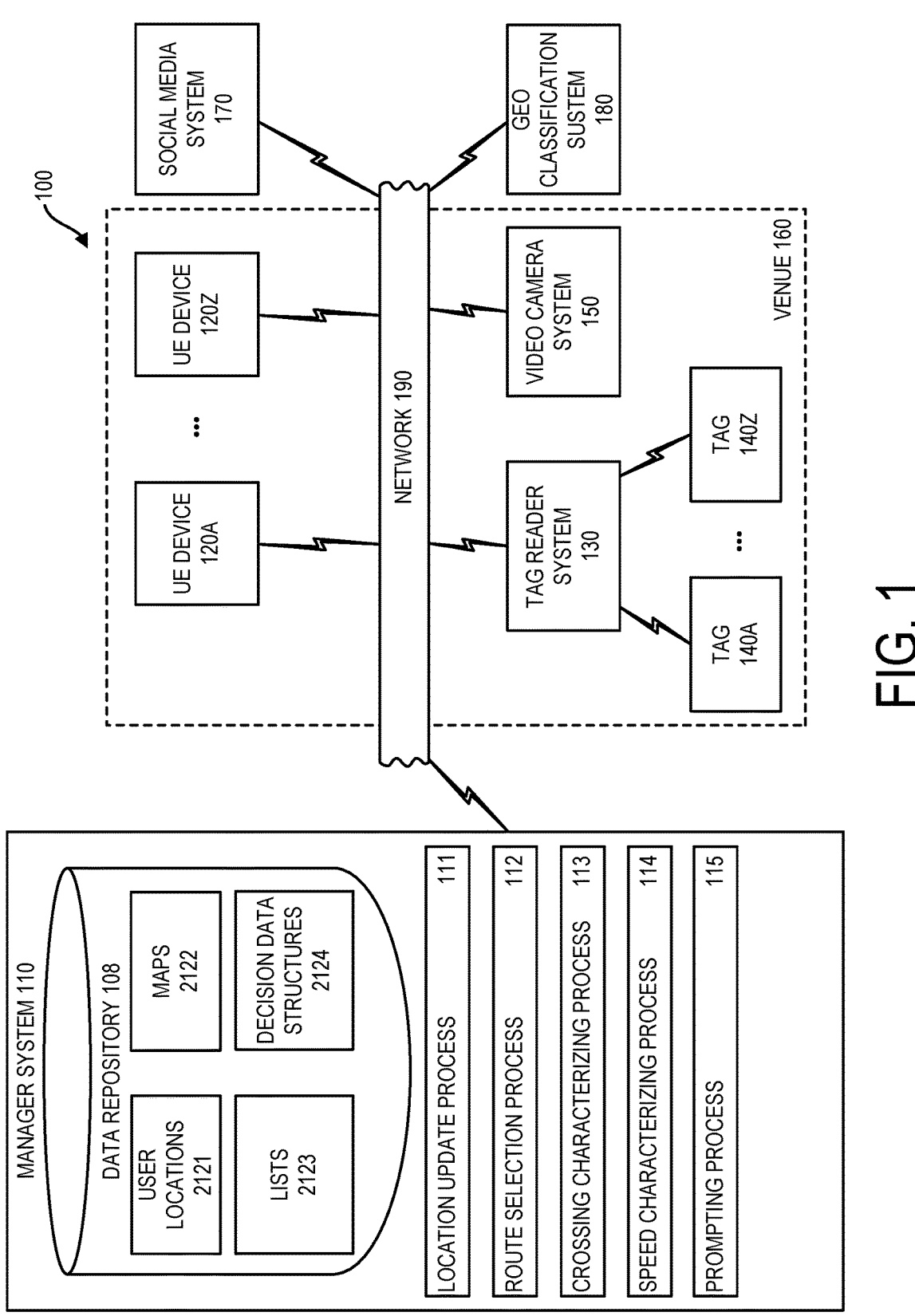
FIG. 1 depicts a system having a manager system, a UE device and other components according to one embodiment.

System 100 for use in promoting avoidance of pedestrian crossings in a venue is shown in FIG. 1. System 100 can include manager system 110 having an associated data repository 108, a plurality of user equipment (UE) devices 120A-120Z, tag reader system 130 for reading tags 140A-140Z, and video camera system 150. Manager system 110, UE devices 120A-120Z, tag reader system 130, and video camera system 150 can be in communication with one another via network 190. System 100 can include numerous devices which can be computing node-based devices connected by network 190. Network 190 can be a physical network and/or a virtual network. A physical network can be, for example, physical telecommunications network connecting numerous computing nodes or systems such as computer servers and computer clients. A virtual network, for example, can combine numerous physical networks or parts thereof into a logical virtual network. In another example, numerous virtual networks can be defined over a single physical network. In one embodiment, manager system 110 can be external to UE devices 120A-120Z, tag reader system 130, and video camera system 150.

In one embodiment, manager system 110 can be collocated with one or more UE devices 120A-120Z, tag reader system 130 and/or video camera system 150. Referring to FIG. 1, UE devices 120A-120Z, tag reader system 130, tags 140A-140Z, video camera system 150, as well as network 190 can be located within venue 160. Manager system 110 can be external to venue 160 or can be located within venue 160. According to one embodiment, respective UE devices 120A-120Z can be associated to respective users of system 100. Users of system 100 can include, e.g., agent users or patron users. Agent users can be agents e.g., employees of an enterprise entities that operate venue 160. Patron users can include users who visit venue 160 for acquisition of items. According to one embodiment, venue 160 can be a venue in which items are located for acquisition by patron users. According to one embodiment, venue 160 can be provided by a retail store.

Each of the different UE devices 120A-120Z can be associated to a different user. Regarding one or more UE device 120A-120Z, a computer device of one or more client UE device 120A-120Z, in one embodiment, can be a computing node-based device provided by a client computer, e.g., a smart phone or tablet, a laptop, smart watch, or PC that runs one or more program, e.g., including a web browser for viewing web pages. Respective UE devices 120A-120Z can be permanently associated to a user e.g., as in the case of a personally owned smart phone or can be temporarily associated to a user, e.g., in the case that UE device 120A is mounted to a cart, e.g., a shopping cart moveable within venue 160.

Manager system 110 can include data repository 108 which stores various data. In user locations area 2121, data repository 108 can store data specifying locations of respective users of system 100 within venue 160. Manager system 110 can be configured to iteratively update and store data on a current location of respective users within venue 160 and store such location data within user locations area 2121 of data repository 108. Users of system 100 can include. e.g., agent users who can be, e.g., employees or other agents of an enterprise entity operating venue 160 or users can include patron users. Users can include, e.g., registered users and guest users. Data repository 108 and maps area 2122 can store in maps area 2122 map data that specifies venue layout along with data on location of items within a venue. The venue layout data can include, e.g., overall data on coordinate locations occupied by venue 160 including infrastructure boundary locations and other relevant infrastructure defining venue 160, e.g., wall, shelves, checkout areas, and the like. Manager system 110 can be configured to examine data of data repository 108 to derive additional parameter values which can be stored in data repository 108, and manager system 110 can be configured to train predictive models by machine learning using data of data repository 108.

Venue data stored within maps area 2122 can specify specific coordinate locations in which various specified items are located. Manager system 110 can be configured to iteratively update map data within maps area 2122, e.g., for situations where a store layout is configured and/or where items are added into venue 160, subtracted from venue 160, or changed to a new location within venue 160. Manager system 110 in lists area 2123 of data repository 108 can store item acquisition lists of various users of system 100. At various times, users of systems such as enterprise agent users and/or patron users can pursue the acquisition of items within venue 160, according to an item acquisition list e.g., a shopping list. According to one scenario, a patron user can use an online web portal to define items for pickup by the patron user and an enterprise agent user can travel about venue 160 to collect the items on the list for pickup by the patron user. In another scenario, a patron user can use an enterprise supported software application to generate an item acquisition list and then can travel within venue 160 to self-collect the items on the item acquisition list defined by the patron user. In one scenario, there can be multiple users, e.g., enterprise agent users and/or patron users within venue 160 and respective ones of the users can be completing separate and respective item acquisition lists simultaneously.

Data repository 108 in decision data structures area 2124 can store decision data structures for use in providing action decisions by manager system 110. Decision data structures area 2124 can include, e.g., decision trees and/or decision tables. In one embodiment, decision data structures area 2124 can include, for respective locations within venue 160, probability trees. A probability tree for a certain location can specify the probability of a user traveling to a next subsequent location during a subsequent time period. A probability tree for a specific location can specify for multiple different candidate future coordinate locations the probability of the user having moved to the candidate coordinate location.

Manager system 110 can run various processes. Manager system 110 can run location update process 111, route selection process 112, crossing characterizing process 113, speed characterizing process 114, and prompting process 115. Manager system 110 running location update process 111, in one embodiment, can include manager system 110 iteratively updating time stamped location data for all users within venue 160 in storing such time stamped location data in user locations area 2121. The location data for respective users within venue 160 can include time stamped coordinate locations for the respective users. Manager system 110 running location update process 111 can include manager system 110 iteratively updating location data for respective users of system 100 within venue 160 at a predetermined refresh interval, e.g., such as once every 1 second, once every 3 seconds, once every 5 seconds, once every 10 seconds, once every 30 seconds, etc.

Manager system 110 running location update process 111 can include manager system 110 determining current location for all users currently within venue 160 using one or more location determination method. According to one embodiment, system 100 can include wireless network-based locating services employing e.g., received signal strength (RSSI), triangulation, and/or time of flight processes. Wireless network-based location services can include, e.g., cellular tower-based location services and/or wireless local area network, e.g., WIFI-based location services. System 100 can alternatively or additionally employ global positioning system (GPS) based locating services in which location data is determined based on signals received from orbiting satellites. Alternatively or additionally, system 100 can employ radio frequency identification (RFID) based tag reading locating services. For example, tag reader system 130 within venue 160 can employ a plurality of tag readers distributed throughout venue 160. Tag reader system 130 can report respective locations of respective users within venue 160 based on beacon proximity, triangulation and/or time of flight data resulting from reading of RFID tags associated to the respective users. Respective users within venue 160 can carry respective RFID tags, e.g., in the form of wallet cards and/or key fob cards that have been presented to the various users. System 100 alternatively or additionally can employ locating services provided using video camera system 150. According to one embodiment, video camera system 150 can include a plurality of video cameras distributed throughout venue 160 such as a plurality of overhead video cameras to obtain video data representing persons distributed throughout an entire venue for venue 160. Manager system running location update process 111 can perform image data processing to detect and count users at different locations within venue 160 based on known locations and orientations of video cameras of video camera system 150. Manager system 110 can derive coordinate locations for respective users based on obtained video image data obtained using video camera system 150. For the described detection of and counting of users, manager system 110 can store mapping data that maps pixel locations of pixel data obtained from video cameras disposed at known location and known orientations to spatial coordinate locations. Manager system 110 with use of video camera system 150 can be configured so that any distinguishing features respective to an individual (e.g., facial features, personal identifying information) can be obfuscated from obtained video image data obtained with use of video camera system 150. System 100 can be configured so that a user of system 100 can "opt in" or "opt out" of use of video image data for detection or counting of users within a venue.

Manager system 110 running route selection process 112 can generate a limited number of candidate routes and select a best route from the generated candidate routes. Manager system 110 running route selection process 112 can iteratively perform route selection for respective users within venue 160 so that a plurality of routes defined by a succession of routes are provided for respective users of system 100. Where a user of system 100 has an active associated item acquisition list, manager system 110 running route selection process 112 can include manager system 110 generating routes for a user in dependence on data of the item acquisition list. Manager system 110 running route selection process 112 can include manager system 110 running crossing characterizing process 113 and speed characterizing process 114.

Manager system 110 running crossing characterizing process 113 can include manager system 110 for respective candidate routes predicting a probability of user crossings associated to respective ones of the candidate routes. A user crossing herein can refer to the situation where a user moves to a location within venue 160 wherein the user is within a threshold distance of another user, e.g., six feet or two meters. Embodiments herein recognize that maintaining a substantial distance between users can provide safety and health benefits to respective users within venue 160. For example, providing a safe distance between users can reduce the likelihood of infectious disease being communicated from one user to the other and can also reduce the likelihood of injury by collision.

Manager system 110 running speed characterizing process can include manager system 110 predicting traveling speed associated to respective candidate routes generated by route selection process 112. According to one embodiment, the predicted speed associated to a candidate route can be determined based on a distance between the points and can assume an average traveling speed for all users. In some embodiments, predicted speed of a certain user can be based on historical speed data of the certain user which can be determined using historical location data of a user stored in user locations area 2121.

According to one embodiment, manager system 110 running route selection process 112 can examine data output by running a crossing characterizing process 113 and by speed characterizing process 114. Manager system 110 running route selection process 112, according to one embodiment, can include manager system 110 applying a multi-factor formula in which a first factor is a crossing avoidance factor output by crossing characterizing process and a second factor is a speed factor output by speed characterizing process 114. Manager system 110 running route selection process 112, according to one embodiment, can score various candidate routes for a user that are generated by route selection process 112 using a crossing avoidance criterion and a speed criterion. Manager system 110 running route selection process 112 can select the highest scoring candidate route as the selected route output by route selection process 112.

Manager system 110 running prompting process 115 can include manager system 110 generating prompts that guide a user in traveling along a selected route after it is selected. Manager system 110 running prompting process 115 can generate prompting data and can send the prompting data for presentment by a UE device associated to a user being prompted to travel toward an item destination along a selected route.

Figure 2:
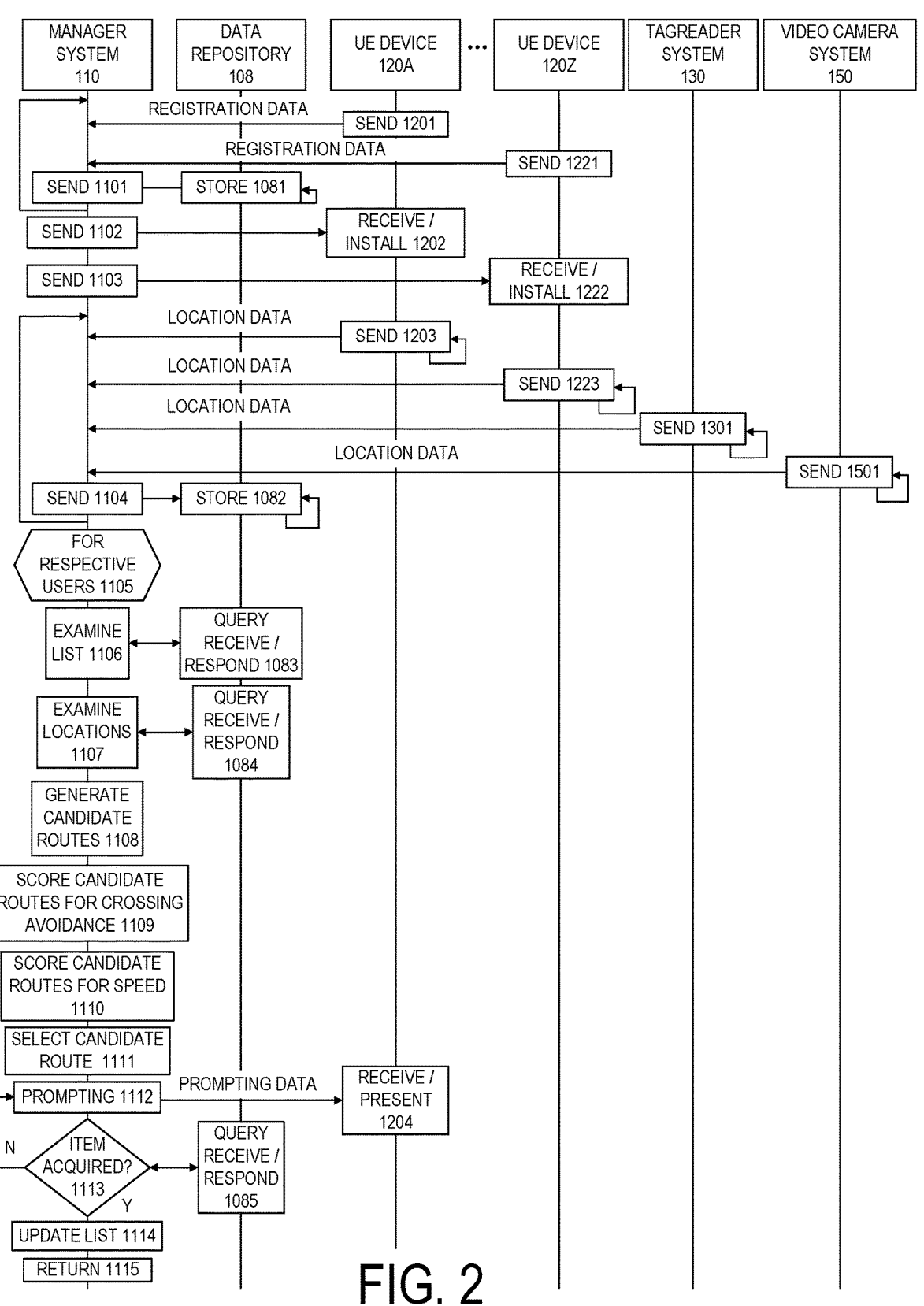
FIG. 2 is a flowchart illustrating a method for performance by a manager system according to one embodiment.

A method for performance by manager system 110 interoperating with UE devices 120A-120Z, tag reader system 130, and video camera system 150 is described with reference to the flowchart of FIG. 2. At blocks 1201 and 1221, UE devices 120A-120Z can be sending registration data for registering users associated to respective UE devices 120A-120Z for services provided by system 100 and manager system 110. Users of UE devices 120A-120Z can be defining registration data using instances of user interface 3000 displayed on display of respective UE devices 120A-120Z.

Figure 3:
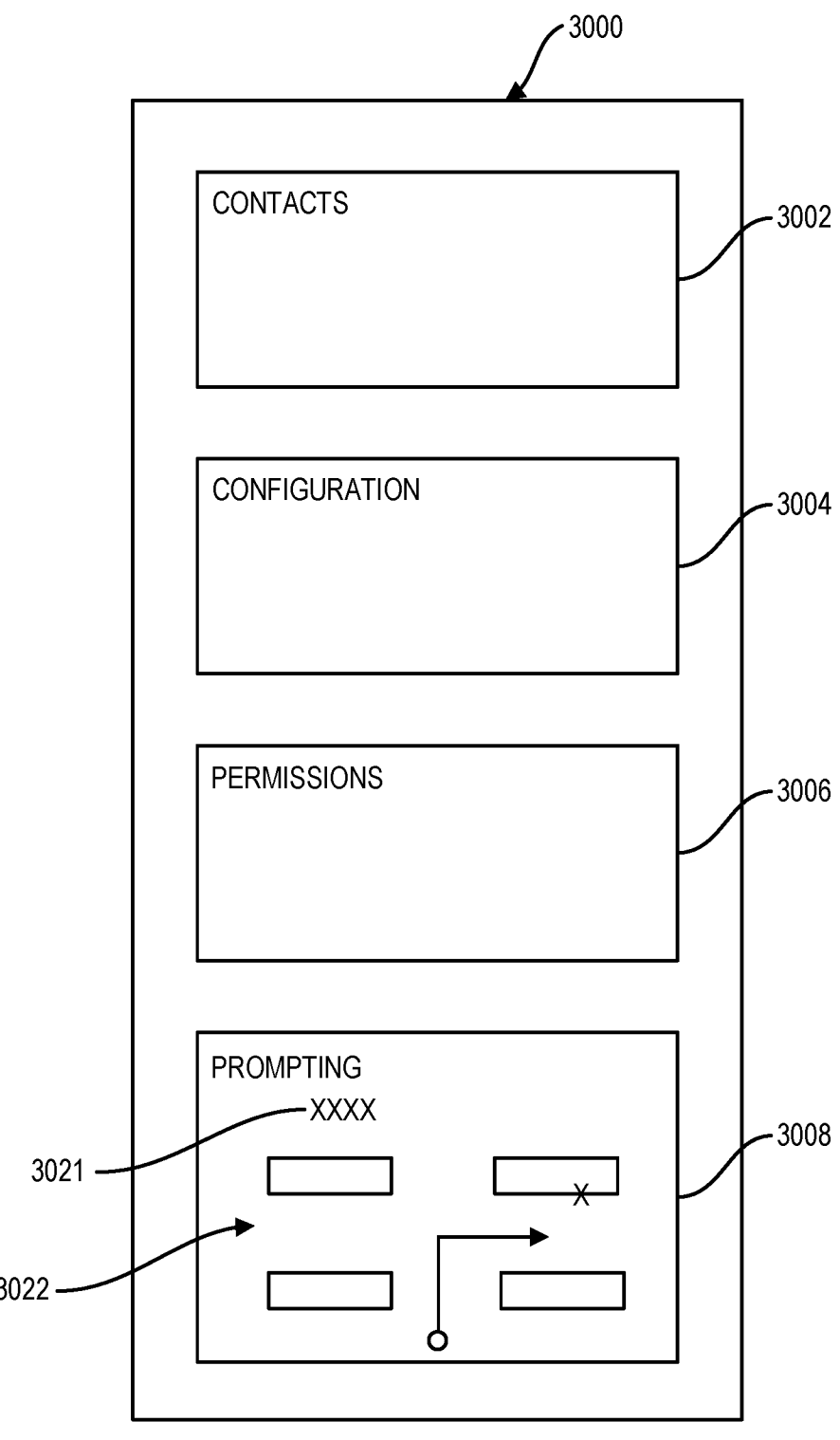
FIG. 3 depicts a user interface according to one embodiment.

A user interface 3000 for display on a UE device 120A-120Z is shown in FIG. 3. User interface 3000 can be a displayed user interface and can include contacts area 3002, configuration area 3004, permissions area 3006, and prompting area 3008. In contacts area 3002, a user can specify contacts of a user, e.g., mailing addresses, email addresses, social media account, and the like. In contacts area 3002, a user can register various UE devices of a user, e.g., smartphones and the like, as well as tag cards in the possession of a user. In configuration area 3006, a user can specify preferences of a user, e.g., in regard to user interface feedback settings and so forth. In configuration area 3006, a user can also define item acquisition data, e.g., shopping list data, that specify items for acquisition of a user. In permissions area 3006, a user can define permissions of a user, e.g., in permissions to user social media account data of a user and permissions to use location data of a user and so forth. In response to the receipt of the registration data sent at blocks 1201 and 1221, manager system 110 at block 1101 can send receive registration data for storage into data repository 108. In response to receipt of registration data for a user, manager system 110 can assign to each unique user a universally unique identifier (UUID). In data repository 108, manager system 110 can associate data for each respective user to the UUID for the respective user. In response to the receipt of registration data, manager system 110 can proceed to blocks 1102 and 1103.

At block 1102 and 1103, manager system 110 can send installation packages for receipt and installation by respective UE devices 120A-120Z. Installation packages sent at block 1102 and 1103 can include, e.g., libraries and executable code for support of participation of UE devices 120A-120Z in system 100 for receipt of services provided by manager system 110 and system 100. UE devices 120A-120Z can receive and install received installation packages at block 1202 and block 1222, respectively. The installation packages when installed can enable UE devices 120A-120Z, e.g., to respond to prompting data in order to present prompting data to user for guiding a user to a specific location within a venue.

At blocks 1203, 1223, 1301, and 1501, UE device 120A-120Z, tag reader system 130 and video camera system 150 can be iteratively sending location data. As indicated by send blocks 1203, 1223, 1301, and 1501, manager system 110 can be iteratively receiving location data which location data can be sent by manager system 110 at block 1104 for receipt and storage into data repository 108 at block 1082. The received location data can include time stamped coordinate location data. The iteratively received location data can specify respective current coordinate locations of users within venue 160. As indicated by the return loop successive to send block 1104, manager system 110 can be iteratively receiving time stamped coordinate location data specifying respective locations of users within venue 160 during a deployment period of manager system 110.

At blocks 1105 to 1115, manager system 110 for respective users within venue 160 can be (a) determining respective user routes for the respective users, and (b) guiding the respective users to travel according to the determined routes. Manager system 110 can guide a user in the performance of a succession of routes within a venue so that multiple items on an item acquisition list are acquired. Blocks 1106, 1107, and 1113 can include iterative queries of data repository 108 for access of data therein as indicated by query receive/respond blocks 1083, 1084, and 1085.

For a respective user (block 1105), e.g., the user of UE device 120A, manager system 110 at block 1106 can examine an item acquisition list for the respective user. In response to completion of block 1106, manager system 110 can proceed to block 1107 at which manager system 110 can examine locations of respective users within venue 160. At block 1107, manager system 110 can determine coordinate locations for respective users within venue 160 based on the most recent location data for the respective users stored at block 1082.

At block 1108, manager system 110 can generate candidate routes for respective users in dependence on the determined locations of the respective users examined at block 1107. At block 1108, manager system 110 can determine coordinate locations for respective users within venue 160 based on acquisition list data for the respective users stored at block 1081. In response to generating candidate routes at block 1108, manager system 110 can proceed to block 1109. At block 1109, manager system 110 can score the candidate routes according to a crossing avoidance criterion. In response to completion of block 1109, manager system 110 can proceed to block 1110. At block 1110, manager system 110 can score candidate routes according to a speed criterion. In response to completion of block 1110, manager system 110 can proceed to block 1111. At block 1111, manager system 110 can select a candidate route from the generated candidate routes in dependence on the scoring performed at blocks 1109 and 1110.

Further description of blocks 1106 to 1110 is set forth in reference to the flowchart of FIG. 4 illustrating in greater detail an exemplary method for route generation. Referring to the flowchart of FIG. 4, manager system 110 at block 4002 can make a list of candidate routes from a current location of a certain user to respective possible next items of an item acquisition list associated to the user. According to one aspect, manager system 110 referring to venue map 160M of FIG. 5 can be contemporaneously determining routes for different respective users and prompting those users to travel along selected current routes for the respective users.

Figure 5:
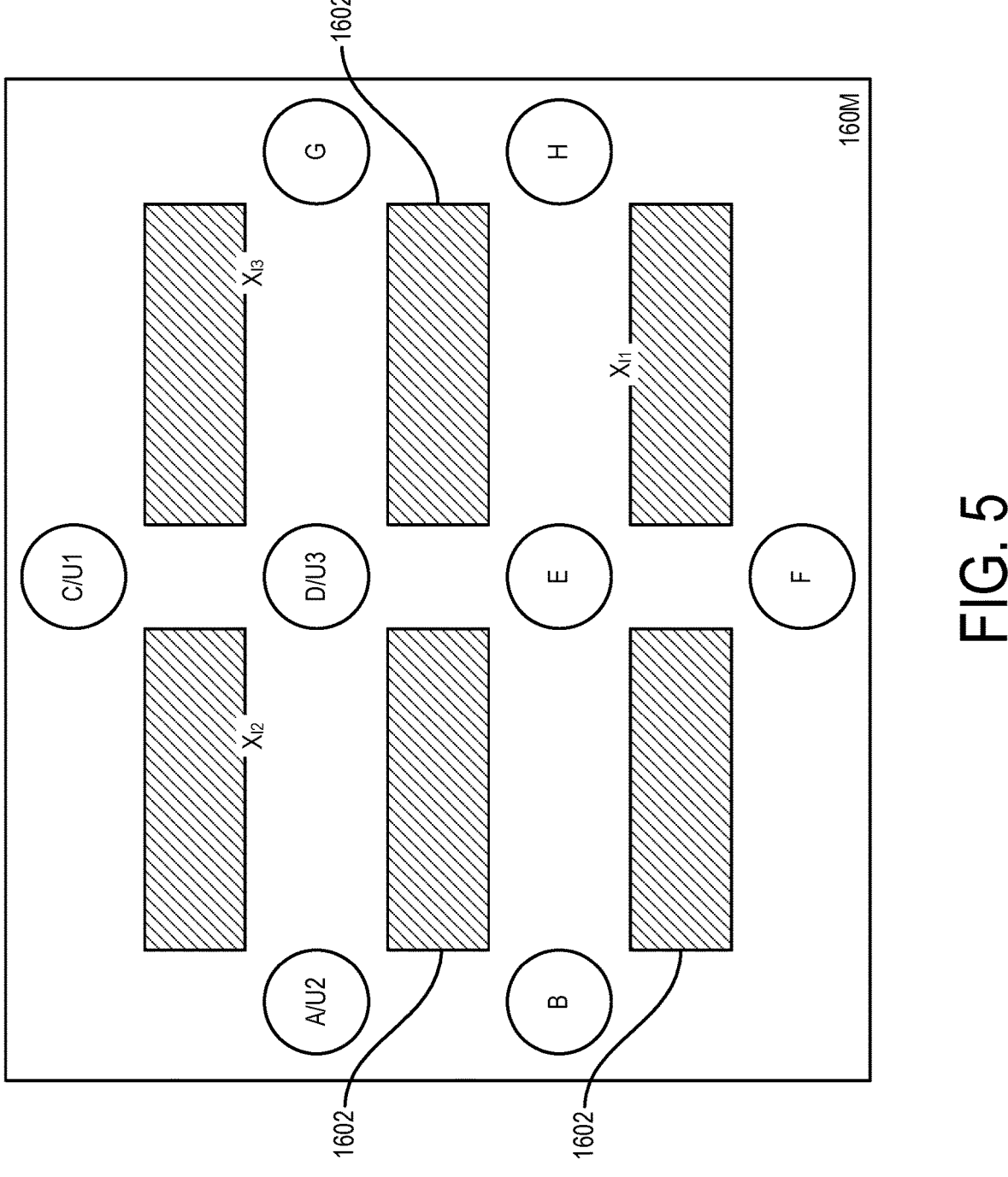
FIG. 5 depicts a venue map according to one embodiment.

Referring to the venue map 160M of FIG. 5, first user U1 can be located at aisle intersection C, second user U2 can be located at a second intersection A, and a third user, U3, can be located at a third user aisle intersection at location D. The ensuing description sets forth how manager system 110 can determine a current route for a first user U1. However, it will be understood that contemporaneous with determining a succession of routes for user U1 and prompting the first user U1 to travel along those routes, manager system 110 can be contemporaneously determining successive routes for user U2 and can be prompting user U2 to travel along determined routes for user U2 and can also contemporaneously be determining a succession of routes for user U3, and can be prompting user U3 to travel along a determined current route for user U3.

Referring to the flowchart of FIG. 4, manager system 110 at block 4002 can make a list of candidate routes commencing from a current location of the first user U1 to respective possible next items of an item acquisition list for the first user, U1. FIG. 5 illustrates venue map 160M of venue 160 with information of locations of users U1, U2, and U3 superimposed thereon as read from data repository 108 as well as the coordinate locations of items I1, I2, and I3 superimposed thereon which are items of an item acquisition list associated to user U1, stored in data repository 108. At block 4002, manager system 110 can make a list of candidate routes from a current location of a user U1 to respective possible next items from an item acquisition list of user U1.

In one embodiment, manager system 110 can generate one or more candidate route commencing at a current location of a user for each respective remaining item for acquisition by the user from an item acquisition list of the user. Referring again to the flowchart of FIG. 4, manager system 110 at block 4002 can make a list of candidate routes from a current location of a user U1 to respective possible next items of the user. Thus referring to FIG. 5 showing venue map 160M, a user U1 at location C candidate routes generated by manager system 110 for user U1 from coordinate location C to a next item of the user's item acquisition list can include a plurality of routes from coordinate location C of user U1 to the coordinate location XI1 of a first item, a plurality of routes from the current coordinate location C to the coordinate location XI2 of a second item, and can include a plurality of candidate routes from the coordinate location C to coordinate location XI3 of a third item of an item acquisition list of the first user.

In the venue map 160M, the coordinate locations of first, second, and third items of an item acquisition list of a first user are depicted by XI1, XI2, XI3, respectively. Candidate routes from coordinate location C to coordinate location XI1 can include e.g., the route C-D-E-XI1, C-D-G-H-XI1, C-G-H-CI1 and so on. Candidate routes from coordinate location C (the current location of user U1) to item I2 can include e.g., the route C-D-XI2, C-A-XI2, and conceivably C-A-B-E-G-XI2 and so on. Candidate routes from location C to the coordinate location XI3 of the third item can include e.g., C-D-XI3, C-G-XI3, and conceivably e.g., C-D-E-H-G-XI3 and so on. For use in selecting a current route from a set of candidate routes, manager system 110 can proceed to block 4004. For generating candidate routes, manager system 110 can identify all possible routes expressed in terms of connected reference locations A, B, C, D, E, F, G between a current location and each remaining item for acquisition. For generating candidate routes while reducing use of computing resource, manager system 110 can filter out possible routes from generated candidate routes subject to evaluation. For filtering out possible routes from a list of possible routes, manager system 110, according to one embodiment, can remove routes having a threshold exceeding the number of "hops" between reference locations and the item destination location. Thus, if a hop limit is 5, the identified possible route C-D-E-H-G-XI3 may be removed for generation of the list of candidate routes for evaluation based on it having six "hops". When generating candidate routes for a certain user, e.g., user U1, manager system 110 can assign predicted arrival times to the destination item coordinate location of the route and can assign predicted arrival times to each hop reference location within the route. Manager system 110 can use the specified arrival times when cross referencing a candidate route to location probability trees for each respective remaining user in a venue. The arrival times, in one embodiment, can assume an average traveling speed for all users. In some embodiments, specified arrival time of a certain user can be based on historical speed data of the certain user which can be determined using historical location data of a user stored in user locations area 2121.

At block 4004, manager system 110 can for respective remaining users in venue 160 relative to first user U1 access probability decision trees associated to the current location of the respective remaining users. In the described scenario, users U2 and U3 can be regarded to be remaining users relative to user U1 in venue 160 depicted in venue map 160M of FIG. 5. For selection of a current route from the candidate routes generated at block 4002, manager system 110 can access at block 4004 probability decision trees for the locations of the remaining users U2 and U3. The probability decision trees can characterize the probabilities of a user at the current locations of users U2 and U3 achieving respective candidate future locations during a subsequent time period.

Figure 6:
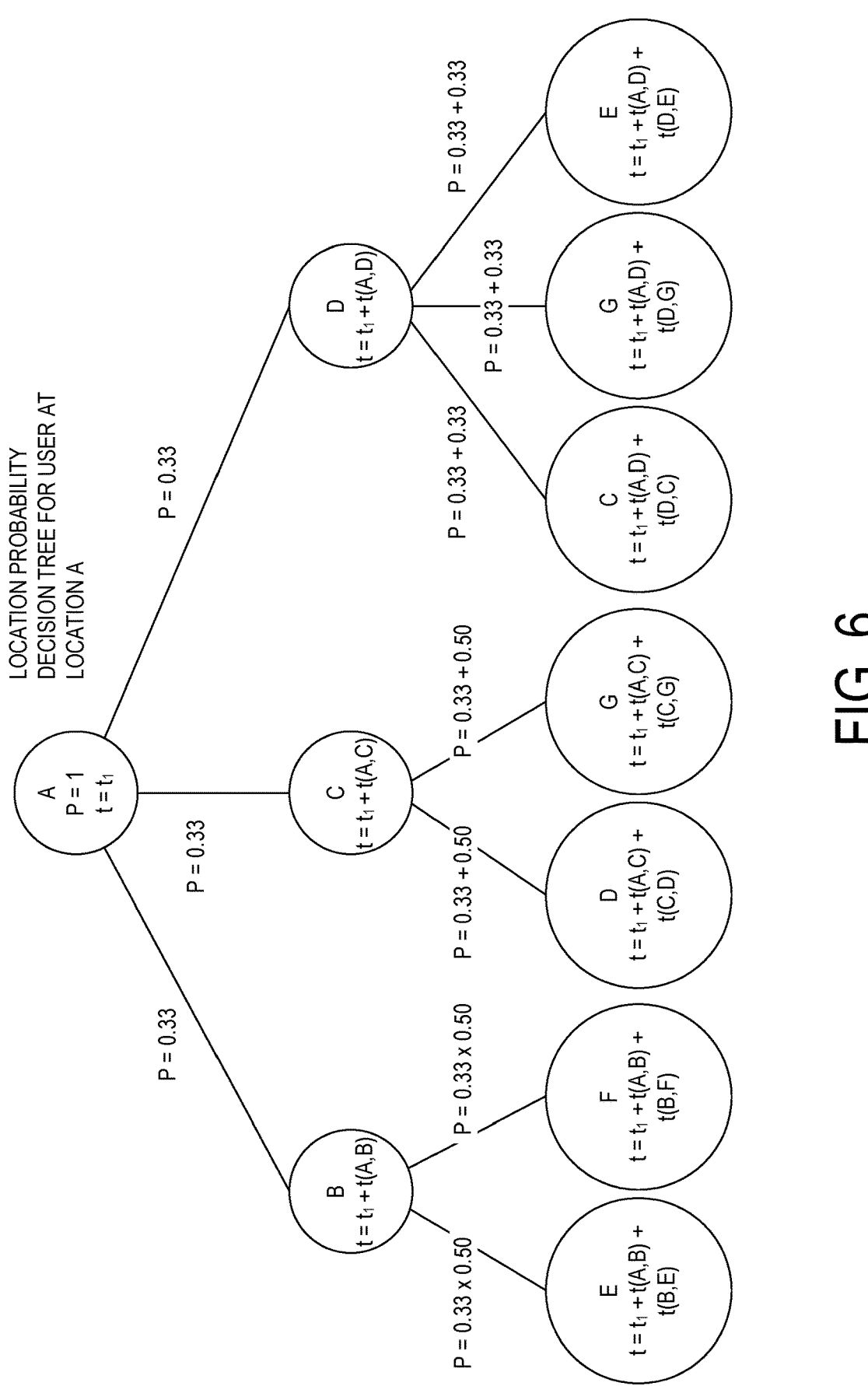
FIG. 6 depicts a decision tree decision data structure according to one embodiment.
Figure 7:
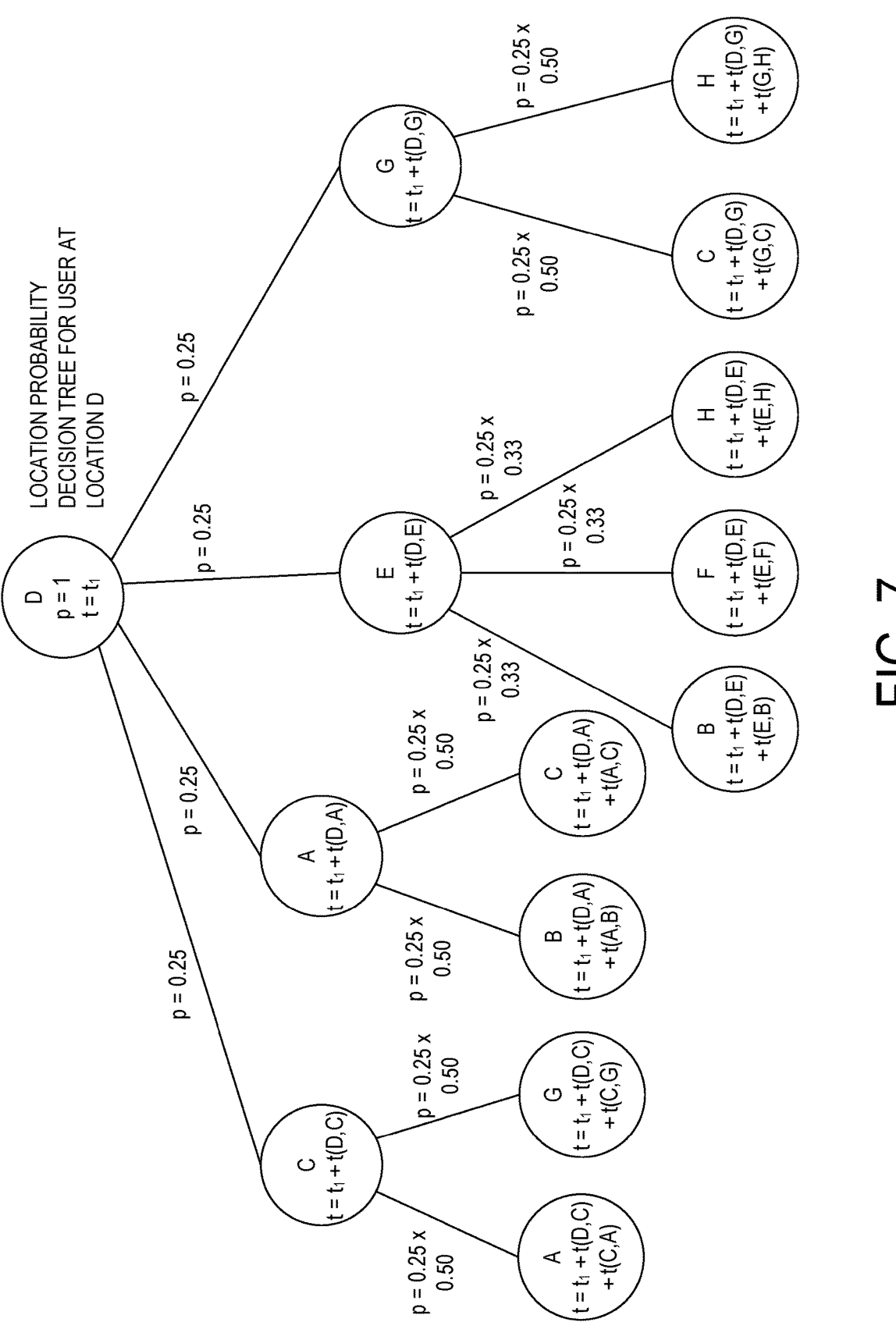
FIG. 7 depicts a decision tree decision data structure according to one embodiment.

FIG. 6 depicts location probability decision tree for location A at which user U2 is currently located in the described scenario. FIG. 7 depicts location probability decision tree for location D, the location at which user U3 is located in the described scenario. The location decision probability trees of FIGS. 6 and 7 infer and predict candidate future locations of a given user at a current location.

Manager system 110 in decision data structures area 2124 can store location decision probability trees for each respective coordinate location for a user within a venue 160. In the described example of FIG. 5, manager system 110 can store location decision probability trees for each of the depicted reference locations, A, B, C, D, E, F, G, H. Manager system 110 at block 4004 can access location probability trees for each respective location within a venue where a remaining user is currently located. Manager system 110, in reference to the described examples, can resolve user coordinate locations to nearest neighbor reference locations A-H depicted in FIG. 5. Manager system 110 for a given venue map 160M, as depicted in FIG. 5, can provide any number of reference locations (e.g., new reference locations intermediate to those depicted in FIG. 5), and can store in decision data structures area 2124 location decision trees for each reference location. In venue map 160M, reference locations provided by intersection locations A through H are indicated. The intersections can be aisle intersections wherein the aisles are defined by infrastructure 1602 of a venue wherein the infrastructure 1602 can be provided by e.g., shelving or displays.

Referring to FIG. 6, a location probability decision tree for a user U2 currently at location A is shown. Referring to the location decision tree, the user U2 can be inferred to have a one-third probability of next traveling to intersection coordinate location B, a one-third probability of traveling to intersection coordinate location C, and a one-third probability of next traveling to intersection coordinate location D. Referring to the location probability decision tree of FIG. 6, respective candidate feature locations can have associated probabilities and future times.

According to one embodiment, the probability values and time values specified within the location probability decision trees of FIG. 6 and FIG. 7 can be predetermined by an administrator user and/or can be manually adjusted by a user, e.g., as determined by observed trends observed by an administrator user. In another embodiment, the values of the location probability decision trees of FIGS. 6 and 7 can be iteratively updated by machine learning processes using historical data of a user or a set of users. For example, time values specified in a location probability decision tree can be lengthened in the case that a user exhibits a historical pattern of traveling slowly within a venue, and values specified in a location probability decision tree can be lengthened in the case that a user exhibits a historical pattern of traveling slowly within a venue.

According to one embodiment, manager system 110 at block 4004 can access for each location of a current remaining user, e.g., user U2 and user U3 for the respective locations of each remaining user, a baseline location probability decision tree as shown in FIGS. 6 and 7. Manager system 110 can use the baseline decision data structure in the case that no historical data for the respective user exists, and in the case that historical user behavior pattern data for the user does exist, manager system 110 can bias values of the selected location probability decision tree using the historical pattern data of the relevant user. In the described example, the location probability decision tree for coordinate location A can be biased using historical data of user U2 who is located at location A, and the location probability decision tree of FIG. 7 for location D can be biased using historical data of user U3 who is located in the described scenario at location D.

In response to completion of block 4004, manager system 110 can proceed to block 4006. At block 4006, manager system 110 can determine predicted patron crossings associated to the respective candidate routes generated at block 4002 using the accessed location probability decision trees for the respective remaining users accessed at block 4004.

For determining predicted patron crossings at block 4006, manager system 110 can cross reference the candidate list of routes generated at block 4002 for a certain user with the accessed location probability decision trees accessed at block 4004. In other words, at block 4006, manager system 110 can compare a candidate route with respective routes of remaining users within a venue 160 as defined by the accessed location probability decision trees for the respective remaining users. Manager system 110 at block 4006 can consider the travel times of the candidate routes and the times that are specified in the accessed location probability decision trees accessed at block 4004.

According to one embodiment, the arrival times of the candidate routes generated at block 4002 can be predetermined. In another embodiment, the arrival times associated to the candidate routes generated at block 4002 can be biased by historical data of the user for which the candidate routes are generated. In addition to using time associated to candidate routes and to location probability decision trees, manager system 110 at block 4006 can use the probability specified in the respective location probability decision trees for the remaining users and can also use travel direction for ascertaining prospective crossings. According to one embodiment, the predicted number of crossings (fractional values are possible) between user U1 and a certain remaining user U2 can be assigned a first lower than baseline value when there is a lower than baseline probability of user U1, according to a candidate route, and a remaining user U2, according to a prospective decision tree route of the remaining user U2, being in a common aisle at a common time. According to one embodiment, the predicted number of crossings (fractional values are possible) between user U1 and a certain remaining user U2 can be assigned a second higher than baseline value when there is a higher than baseline probability of user U1, according to a candidate route, and a remaining user U2, according to a prospective decision tree route of the remaining user U2, being in a common aisle at a common time. According to one embodiment, the predicted number of crossings (fractional values are possible) between user U1 and a certain remaining user U2 can be assigned a first lower than baseline value when user U1, according to a candidate route, and a remaining user U2, according to a prospective decision tree route of the remaining user U2, are potentially in a common aisle, e.g., aisle A-D in a common time period and travel in the same direction and can assign a second higher than the baseline value when the user and the certain remaining user U2, according to the probability decision tree of the second user, are potentially in a common aisle, e.g., aisle A-D in a common time period and travel in an opposite direction. Manager system 110 can cross reference each candidate route to probability decision trees for each respective remaining user U2 and U3 in a venue. For performing block 4006, manager system 110 can generate a table data set forth in Table A.

TABLE A

| Candidate route for user U1 | Predicted number of crossings between user U1 and remaining users U2 and U3 | Predicted route time |
|---|---|---|
| CR1 | XX | XX |
| CR2 | XX | XX |
| CR3 | XX | XX |
| CR4 | XX | XX |
| CR5 | XX | XX |
| . . . | . . . | . . . |

For each respective candidate route generated at block 4002 for a certain user U1, manager system 110 can specify predicted crossings associated to each candidate route based on cross referencing the times and coordinate location of the candidate route to the times and coordinate locations referenced in respective location decision trees associated to each remaining user in the venue 160 (user U2 and U3 in the described example).

Manager system 110 can bias the predicted crossings depending on a direction of user U1 and a remaining user associated to a prospective crossing. For example, if, according to a candidate route and a prospective decision tree route of a remaining user, user U1 and the remaining user travel in a common direction, the probability can be biased downward from a baseline value. If user U1 and the remaining user, according to a prospective crossing, travel in opposite directions, the probability value can be increased from the baseline value (the predicted likelihood of a crossing is increased when users potentially are travelling in opposite directions during a common time period.).

In response to completion of block 4006, manager system 110 can proceed to block 4008 in which manager system 110 can score the respective candidate routes in dependence on a predicted number of crossings associated to the respective candidate routes. At block 1110, manager system 110 can score respective candidate routes in dependence on a predicted speed of the respective candidate routes as summarized in Table A and at block 4012, manager system 110 can select a current route for the user, e.g., user U1 from the generated candidate routes generated at block 4002. Manager system 110 for performing blocks 4008, 4010, and 4012, according to one embodiment, can utilize the formula of Eq. 1 hereinbelow:

$$S=F1W1+F2W2 \tag{Eq.1}$$

Where S is the overall score for a candidate route generated at block 4002, F1 is a first factor, F2 is a second factor, W1 and W2 are weights associated to the respective factors F1 and F2. According to one embodiment, F1 can be a crossings factor and F2 can be a speed factor. Using the formula of Eq. 1, manager system 110 can score the respective candidate routes generated at block 4002 and can select the highest scoring candidate route as the current route for the current user, e.g., user U1 in the described example.

Regarding factor F1, manager system 110 can assign scoring values under factor F1 in a manner that is inversely proportional to a number of predicted crossings associated to a respective candidate route. Manager system 110 can assign higher than baseline scoring values under factor F1 in the case that predicted number of crossings associated to a candidate route are lower than a baseline value and can assign lower than baseline scoring values under factor F1 in the case that predicted number of crossings associated to a candidate route are higher than a baseline number of crossings. In such manner, a candidate route that is predicted to be free of or relatively free of crossings can be assigned relatively higher scoring values in comparison to a candidate route in which a significant number of crossings are depicted. As noted previously, the number of predicted crossings associated with a candidate route can be in dependence on relative directions of travel between a user and a remaining user within a venue 160. In another aspect, manager system 110, for determining values for assigning under factor F1, can examine aisle width data associated to an aisle in which a possible crossing is predicted based on a comparison of a candidate route, and a possible route specified in a location probability decision tree indicating that first and second users can occupy a common aisle within a common time window. Such aisle width data case be stored in maps area 2122 of data repository 108. Embodiments herein recognize that if space being shared by first and second users is significantly large, the first and second users may be able to visually analyze the environment and observe a potential for crossing and cooperatively adapt to assume locations within the shared space so that a crossing is avoided. Accordingly, in one aspect, manager system 110 can bias scoring values under factor F1 upward in dependence on an examined aisle width of an aisle identified as a possible location of crossing. According to one embodiment, manager system 110 can bias assigned scoring values under factor F1 upward based on examined aisle data indicating that an aisle width of an aisle identified as a possible location of crossing and having a width satisfying a threshold width renders it possible for first and second users to avoid a crossing in spite of potentially passing each other in opposite directions within a shared aisle.

Manager system 110 for assigning scoring values under factor F2, the speed factor, can consider a distance from a current location to a destination location defined by the location of a possible next item. According to one embodiment, the predicted speed associated to a candidate route can be determined based on a distance between points and can assume an average traveling speed for all users. In some embodiments, predicted speed of a certain user can be based on historical speed data of the certain user which can be determined using historical location data of a user stored in user locations area 2121. As noted, when generating candidate routes for a certain user, e.g., user U1, manager system 110 can assign predicted arrival times to the destination item coordinate location of the route. In one embodiment, manager system 110, for assigning scoring values under factor F2, can apply speed scoring values based on the assigned arrival times in the candidate route.

For assigning scores under factor F2, manager system 110 can, according to one embodiment, employ a traveling salesman problem (TSP) solver tool executable by manager system 110. Employing a TSP solver tool allows manager system 110 to consider not only a route to a next item but an overall course defined by a succession of routes for collecting all remaining items of an item acquisition list. With use of a TSP solver tool, manager system 110 can identify a best overall course defined by a succession of routes for collection of each item XI1, XI2, and XI3. Manager system 110 can assign evaluations to candidate routes with reference to an identified optimized overall course for collection of all items as output with use of a TSP solver tool.

Manager system 110 using a TSP solver tool can output an ordered list of candidate courses according to predicted speed. In such a scenario, the identified optimized course identified by the TSP solver tool will be the highest-ranking candidate route plan. According to one example, in reference to the described scenario, the identified optimized route plan might commence with item coordinate location XI2 (FIG. 5) as the first stop in overall route plan. Referring again to Eq. 1, manager system 110 can assign scoring values under factor F2 in dependence on an output from TSP solver tool. For example, manager system 110 can assign higher than baseline scoring values under factor F2 where the candidate route has an item destination in common with a first stop of an identified optimized course for collecting all items as identified by a TSP solver tool and can assign lower than baseline value under factor F2 in the case that an item destination for a candidate route is not the first stop in an identified optimized overall route plan identified with use of a TSP solver tool. Manager system 110 can use an output from a TSP solver tool in order to filter out and remove certain routes from a set of possible routes at block 1108 in the generation of a limited set of candidate routes at block 1108. Manager system 110 can filter out and remove a possible route, for example, if the route is not included as the first route of a course listed in the top P percentile of the ordered ranking of candidate courses, as output by a TSP solver tool.

In reference to the described scenario, manager system 110 employing a TSP solver tool can identify an optimized course having the item stops in an order XI2-XI1-XI3. In such a situation, manager system 110 can assign a higher than baseline scoring value under factor F2 for the candidate route defined by the path C-D-XI2 and can assign lower than baseline scoring values under factor F2 for the candidate route defined by the path C-D-XI3.

In generating scoring values for factor F2, according to one embodiment, manager system 110 can apply Eq. 2.

$$SV = SF1W1 + SF2W2 \qquad (Eq.1)$$

Where SV is the scoring value to apply under the speed factor F2 of Eq. 1, SF1 is a first speed factor, SF2 is a second speed factor, and W1 and W2 are weights associated to the respective speed factors. According to one embodiment, SF1 can be a predicted time of arrival factor and SF2 can be an optimized TSP solution factor. For assigning scoring values under factor SF1, manager system 110 can apply a scoring value in dependence on the time of arrival specified and predicted for the candidate route being evaluated. For assigning scoring values under factor SF2, manager system 110 can apply a scoring value in dependence on an output of a TSP solver tool, which is output for each new set of candidate routes generated and being evaluated. Manager system 110 can assign higher than baseline value under factor SF2 wherein the candidate route is the first route of an optimized course defined by a succession of routes for collection of all remaining items of an item acquisition list. Manager system 110 can assign a lower than baseline value under factor SF2 wherein the candidate route is not the first route of an optimized course defined by a succession of routes for collection of all remaining items of an item acquisition list. Manager system 110 can also apply scores under factor F2 in dependence on the quality of the candidate route in reference to the overall ordered lists ranking of courses by the described TSP solver. For example, if the candidate route is included as the first route in more than M percent of the highest Nth percentile ranked courses, manager system 110 can apply a higher than baseline value under factor SF2. If the candidate route is not included as the first route in more than M percent of the highest Nth percentile ranked courses, manager system 110 can apply a lower than baseline value under factor SF2.

Embodiments herein recognize that contagious diseases call for precautions. In cases of transmission by proximity, like with Covid-19, distancing is an effective measure. However, embodiments herein recognize that society requires that some level of activity continues to be performed, for the good of the community. Such activities include continued access to food and other basic supplies. Personnel is required in stores for granting such access. One of the precautions adopted by consumers is to use drive-in services instead of going into the stores.

Embodiments herein recognize that as disease transmission risks increase, patron user customers increasingly resort to home delivery and drive-in. This, in turn, results in an increase in the frequency with which shop employees walk around to fetch the items ordered by the customers. Embodiments herein recognize that the probability agent user employees and other users crossing each other increases during the most contagious times. So, as the risk gets contained for patron user customers through use of home delivery and drive-in, said risk increases for agent user shop employees, even where patron users are excluded from a venue. It would therefore seem fair to spend as much care as possible on the protection of the employees.

Embodiments herein can provide dynamic management of the itineraries of users inside a venue. According to one embodiment, the solution can comprise the following components: Smarter item acquisition shopping carts that help agent user employees and other users manage social distancing when fetching items to fulfill patron user customer orders; Somewhat smart shopping carts for patron user customers, in cases where agent user employees and patron user customers share the same space (i.e. venue 160); A central in-store coordination application running on manager system 110 that can use comprehensive information at hand to optimize itineraries of users, e.g., enterprise agent users who are fetching the customer-ordered items.

Patron users visiting a venue can use a smart shopping cart that provides them information about presence around them. In one embodiment, customers may be offered to upload their list prior to visiting the store and to use the advanced cart. Smart carts, in one embodiment, can be enhanced by manager system 110 sending prompting data in dependence on item acquisition lists of a user. This is the case for patron users and agent user store employees who are fulfilling customer orders. Manager system 110 can inform the user on the next optimal item to fetch and the best route to it, considering the distancing factor. According to one embodiment, the cart can include an item recognition feature (e.g. code scanner). The reading of a barcode label or another event such as detected addition of an item into cart can trigger manager system 110 to run its algorithm for determining the next optimal item.

Figure 8:
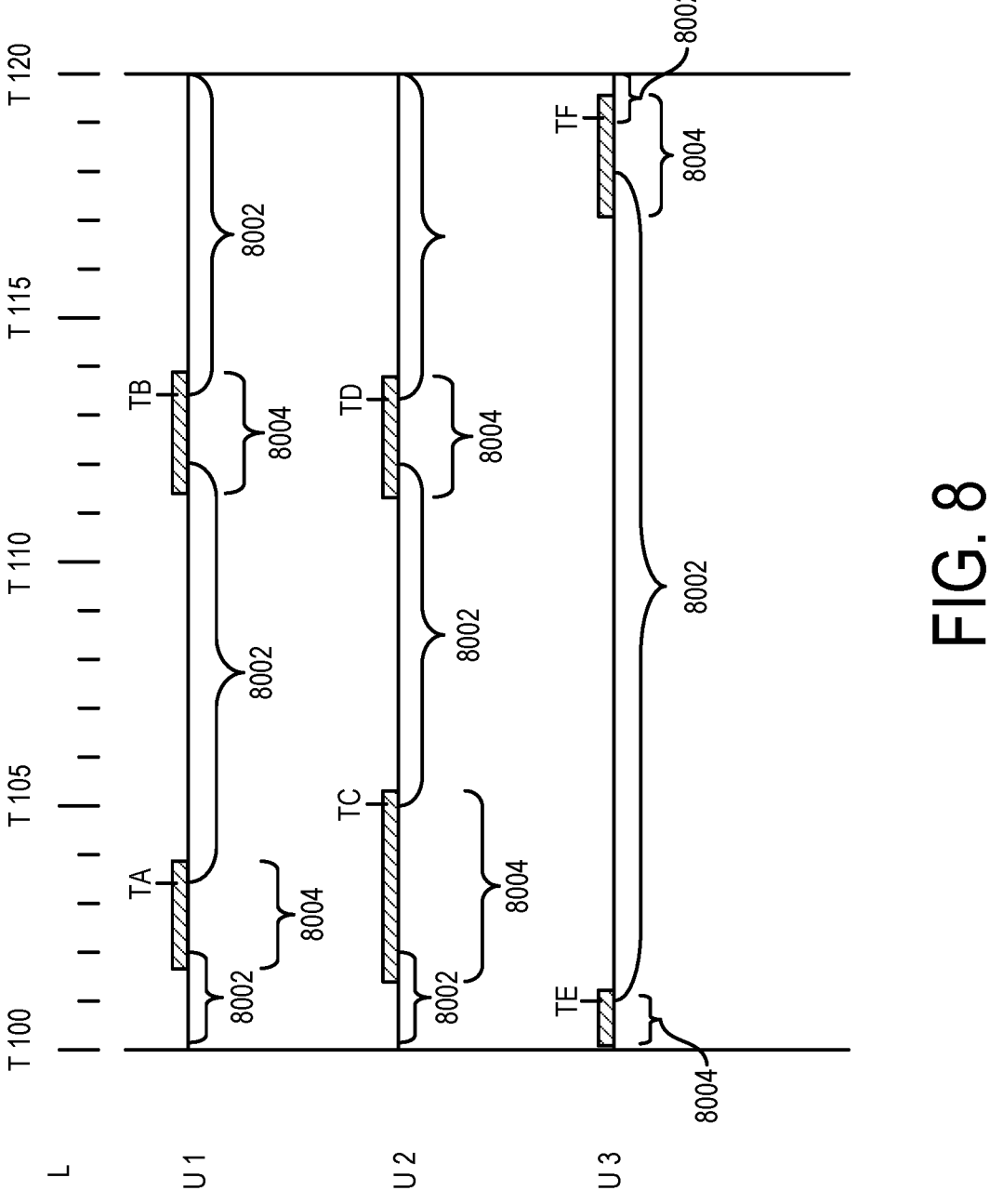
FIG. 8 depicts a timing diagram that specifies timing aspects of various operations of a manager system according to one embodiment.

Timing operations of manager system 110, according to one embodiment, are set forth in reference to FIG. 8. Manager system 110 may configure to refresh location data for all users in a venue at set time intervals, e.g., every 5 seconds, every 10 seconds, or another arbitrary interval. Referring to timeline L of FIG. 8, timeline L refers to the location data collection timeline of manager system 110. Manager system 110 can be configured so that at each time interval T100, T101, T102, T103 . . . T120 depicted in FIG. 8, manager system 110 can refresh current location data for each respective user U1, U2, U3 within a venue. That is, at T100, manager system 110 refreshes the current location of all users U1, U2, and U3, and stores time stamped location data for all users. At time T101, manager system 110 refreshes again all location data for all users U1, U2, U3 and so on. As noted, the time intervals can be predetermined.

Referring to timeline U1 of FIG. 8, timeline U1 depicts timing operations associated to the user U1. Referring to timeline U1, time intervals 8002 can be prompting intervals at which intervals manager system 110 can send prompting data presented for presentment at a UE device of a user for prompting the user to travel within the venue along a selected route to a next item coordinate location. Time intervals 8004 of timeline U1 can refer to dwell times of a user where a user is at the location of an item and dwelling at that location. Still referring to timeline U1, time TA of timeline U1 can refer to a time at which manager system 110 examines locations at block 1107 (FIG. 2). The prompting intervals 8002 depicted in FIG. 8 refer to manager system 110 performing prompting at block 1112. With further reference to timeline U1, time TA can refer to the time at which manager system 110 examines locations of a certain user U1 and remaining users U2 and U3 as described in connection with the flowchart of FIG. 4. The time TA depicted in timeline U1 can be triggered by an event, e.g., a user reading a barcode label with a UE device 120A-120Z of the user or by another event, e.g., a duration of a current dwell exceeding a threshold time. When an event triggers acquisition of most recent location data, manager system 110 can access the most recently acquired location data. Thus, with reference to the timeline of U1, manager system 110 at event time TA can access the last collected location data collected at time T103 depicted in timeline L. Similarly, for the event time TB, which can also be triggered by e.g., a barcode scanning or a dwell time exceeding a threshold, manager system 110 for access of most recent location data can access the location data acquired and collected by manager system 110 at block T113 depicted in timeline L.

Timeline U2 depicts a timeline for user U2. Timeline U2 also includes a combination of prompting intervals 8002 and dwell intervals 8004. The timeline U2 also depicts event times TC and TD which can be triggered e.g., by barcode scanning or dwell times exceeding a threshold at which times manager system 110 accesses the most recently collected set of location data for users U1-U3. At time TC, manager system 110 can access the last collected all users location data collected at time T105. At time TD, manager system 110 can access the last collected all users location data collected at time T112.

Referring to timeline U3, timeline U3 is also characterized by prompting interval 8002 and dwell interval 8004. Timeline U3 includes event time TE and TF which can be triggered, e.g., by barcode scanning or dwell times exceeding a threshold at which times TE and TF manager system 110 can access most recently collected location data from data repository 108. At time TE, manager system 110 can access the last collected all users location data collected at time T101. At time TF, manager system 110 can access the last collected all users location data collected at time T119.

Figure 9:
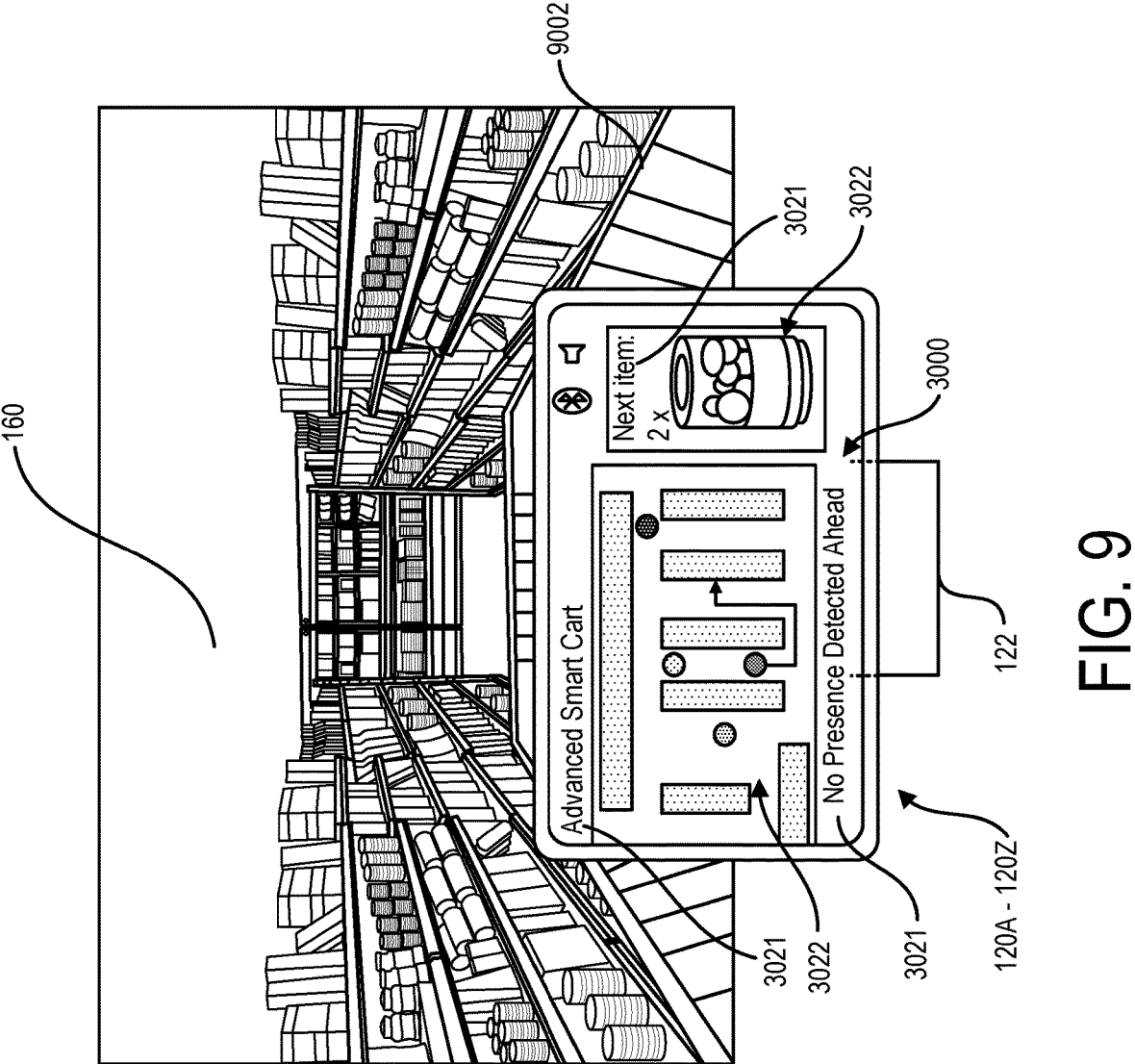
FIG. 9 depicts an item acquisition cart operating within a venue having mounted therein a UE device with an integrated barcode scanner according to one embodiment.

FIG. 9 depicts a shopping cart 9002 within a venue 160. On shopping cart 9002, there can be mounted a UE device 120A-120Z associated to a specific user which can be displayed using user interface 3000 described with reference to FIG. 3. User interface 3000 can include a prompting area 3008 as described in connection with FIG. 3. User interface 3000 as shown in FIG. 9 depicts prompting area 3008 as described in FIG. 3 which prompting area 3008 can present prompting data as shown in FIG. 3 and FIG. 9 which prompts a user to travel within a venue along a selected route selected by manager system 110 so that a user arrives at a coordinate location of a next item for acquisition with mitigated risk of crossing another user. Prompting data can include text based prompting data 3021 (FIG. 3) and/or graphics based prompting data 3022 for prompting a user to travel along a selected route. Graphics based prompting data can include e.g., depictions of a commencement and destination location, depictions of venue infrastructure, arrows to depict a direction of travel, and the like. Prompting data can also include audio based prompting data presented on a UE device being prompted to travel along a selected route. UE device 120A-120Z can include a bar code reader 122 for reading bar code labels on items within venue 160. A user by using bar code reader 122 to scan a bar code of a picked up item can trigger an event responded to by manager system 110, such as events TA-TF depicted in the timing diagram of FIG. 8.

Figure 10:
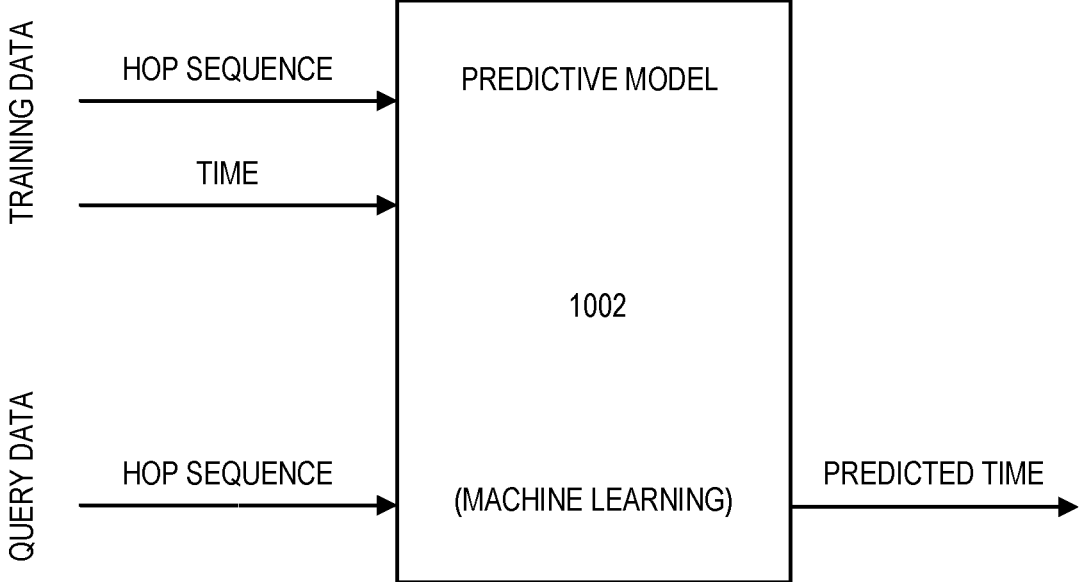
FIG. 10 depicts a predictive model that can be trained by machine learning according to one embodiment.

FIG. 10 depicts predictive model 1002 which can be trained with use of machine learning. Predictive model 1002 as shown in FIG. 10 can be trained with training data that comprises sequences of location data of various users of system as stored in user locations area 2121 of data repository 108 (FIG. 1). Predictive model 1002, once trained, can be queried to return predictions as to a speed of travel of a certain user within venue 160. Manager system 110 can train instances of predictive model 1002 for every user which historically traveled within venue. Predictive model 1002 can be trained with iteratively applied sets of training data and once trained, predictive model 1002 is able to respond to queries in order to render predictions. Iteratively applied sets of training data for training predictive model 1002 can include iteratively applied sets of training data that comprise a data set comprising a) a hop sequence, and b) an associated time for completion of a hop sequence. A hop sequence herein can be a historical route of a user or a portion of a route. Referring to the venue map 160M of FIG. 5, the route A-C-G-D comprises multiple hops, e.g., hop sequences, including the hop sequence A-C-G-D, the hop sequence A-C-G, the hop sequence A-C, the hop sequence G-D, and so on. Because manager system 110 can record successions of location data for each respective user within a venue over time, travel times associated with each of the noted hop sequences is derivable from location data stored in user locations area 2121 or data repository 108, training predictive model 1002 with hop sequence associated to times for different types of hop sequences. For different possible hop sequences, predictive model 1002 is able to learn travel speed characteristics of a user throughout different possible hop sequences within a venue.

Predictive model 1002, once trained, is able to respond to query data. Query data can include query data that specifies a hop sequence of interest to manager system 110, e.g., for populating values of a location probability tree being readied for use in performing scoring of candidate routes associated to a user. For example, with reference to block 4004 of the flowchart of FIG. 4, manager system 110 can access a baseline location probability decision tree as shown in FIGS. 6 and 7 for a specific reference location within a venue and then for performance of candidate route evaluation using eq. 1 can bias and customize values of a baseline location probability decision tree in dependence on predicted speed parameter values obtained by querying of predictive model 1002. For example, in determining user specific values, manager system 110 for populating node values that specify arrival times for various prospective intermediate destinations referenced in the location probability decision tree of FIG. 6 can query predictive model for return predicted arrival times. For example, for populating node D depicted in FIG. 6, manager system 110 can query predictive model 1002 with the hop sequence A-D for return of a prediction as to the certain user's arrival time at reference location D. For node C depicted in the location probability decision tree of FIG. 6, manager system 110 can query predictive model 1002 with various queries, e.g., query specifying the hop sequence A-D, the hop sequence D-C, and the hop sequence A-D-C.

According to one embodiment, there is provided a manager system 110 which can be in a venue for managing the movements and distancing of smart shopping carts in the store. There are N agent user employees in the venue, {Ei} with $0 \leq i \leq N$. Manager system 110 can know all the shopping lists (SLi) assigned to agent user employees Ei. Items are removed from SLi once picked up from the shelf by Ei. There can be M patron user customers in the store {Cj} with $0 \leq j \leq M$. Their shopping lists can be unknown or known. In one embodiment, patron user customers may be offered a function for uploading their shopping list, which would allow them to benefit from the advanced shopping cart. Patron user customers Cj are equipped with a smart Cart (CCj).

At block 4004 (FIG. 4), manager system 110 can access location probability decision trees for remaining users within venue 160 based on the respective current location of the remaining users. Referring again to the time in diagram of FIG. 8, manager system 110 at time TA and TB can access location probability decision trees for the respective current locations of users U2 and U3. At times TE and TD, manager system 110 can access location probability decision trees for the respective current locations of users U1 and U3. At times TE and TF, manager system 110 can access location probability decision trees for the respective current locations of users U1 and U2.

In connection with FIG. 8 and FIG. 10, it can be seen that manager system 110 when accessing location probability decision trees for respective current locations of remaining users can bias values within the accessed location probability decision trees in dependence on historical data. For example, manager system 110, as explained with reference to the predictive model 1002 of FIG. 10, can populate the time of arrival values within accessed location probability decision trees in dependence on historical speed data of users. In another aspect, manager system can adapt and access location probability decision trees in dependence on whether remaining users relative to certain users within venue 160 are being guided to travel along a certain route. Referring again to FIG. 8, embodiments herein recognize that remaining users relative to a certain user can, in some instances, be unguided users who are not prompted by manager system 110 to travel according to any particular route of the venue 160. Such users in some instances can be guest users or in some instances can be registered users who have not completed any item acquisition list, i.e., are in a venue simply to browse.

According to one embodiment, manager system 110 when accessing location probability decision trees for respective remaining users at block 4004 can examine system data indicating whether the remaining users are being guided by manager system 110 to travel along a particular route and may examine data indicating whether such remaining users might become guided users during a next time period (i.e., can examine whether remaining users have associated active item acquisition list). According to one embodiment, manager system 110 at block 4004 can access location probability decision trees on the condition that a remaining user is presently not being guided by manager system 110 to travel along a particular route. Referring to the tiny diagram of FIG. 8, manager system at time TA can ascertain that user U2 is idle and not currently being guided by prompting data provided by manager system 110 and thus can determine to access a location probability decision tree for user U2. In such environments where manager system 110 ascertains whether remaining users are being guided, manager system 110 can predict next locations of the remaining users based on the respective current routes of the remaining users which respective current routes manager system 110 is guiding the respective remaining users to perform.

Referring to time TA of the timing diagram of FIG. 8, manager system 110 at time TA can ascertain that the third user (timeline U3) is currently being guided by prompting data to travel along a particularly selected route at time TA and thus can ascertain that the third user, user U3, will next travel along the selected route being prompted for and which the third user, user U3, is being guided to perform by manager system 110. In another embodiment, manager system 110 can bias and populate values within accessed baseline location probability decision trees in dependence on whether a) the user is currently being guided, and b) a determined guideability rating of a user. Embodiments herein recognize that some users can be expected to be more guidable and susceptible to following guiding prompts than other users.

Figure 11:
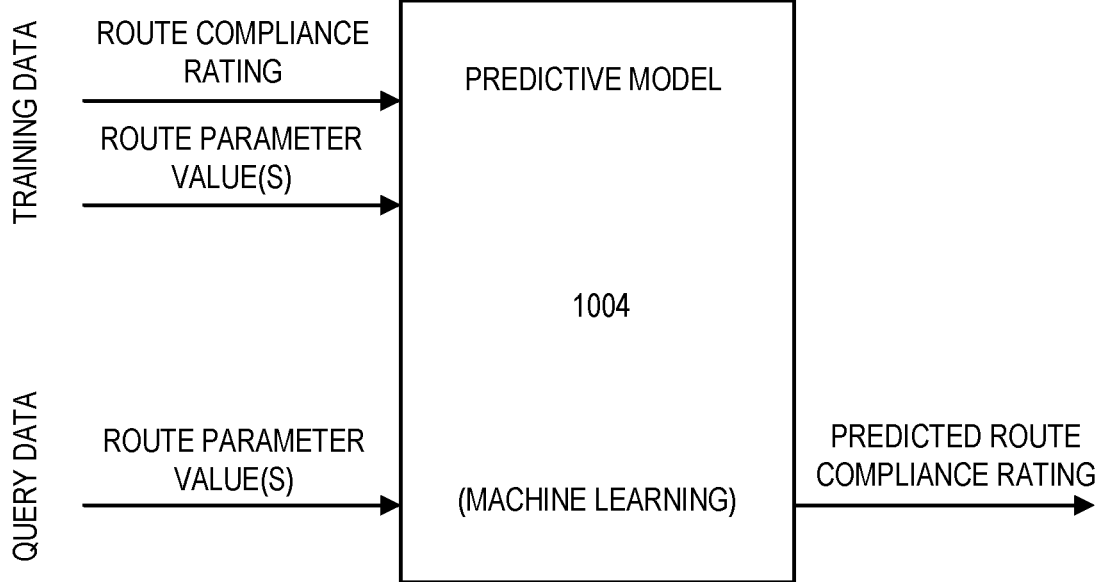
FIG. 11 depicts a predictive model that can be trained by machine learning according to one embodiment.

Referring to FIG. 11, manager system 110 for respective historical users of venue 120 can train with training data instances of predictive model 1004 which when trained can be used to predict route compliance for a certain user, i.e., predicts the degree to which the user follows a prompted for route prompted for by manager system 110. Predictive model 1004 can be trained with use of training data for training predictive model 1004 and can include iteratively applied sets of training data. Manager system 110 can be configured so that when the user completes a current route, i.e., is determined to have reached a destination coordinate location of a current route, manager system 110 records in data repository 108 route compliance rating for the route. Route compliance rating can be determined by examining a Euclidian distance between a selected and prompted for route and an actually traveled route by the user. In some instances, a user after a timeout period may arrive at a destination other than prompted for destination. In such instances, manager system 110 can assign a minimally low route compliance rating for the route. Iteratively applied sets of training data for training predictive model 1004 can include in combination a) route compliance rating for a given route, and b) one or more route parameter value associated to the route. Route parameter values can include such values as a core stage parameter value which indicates the degree of completeness of a current item acquisition list or an overall crowdedness of a venue, i.e., the total number of users within a venue at the time of the route. Embodiments herein recognize that a user's route compliance can sometimes vary in dependence on the crowdedness of a venue.

Predictive model 1004 once trained can respond to query data. Query data can include a set of one or more route parameter value associated to a current candidate route being evaluated at block 4004 to 4008 (FIG. 4). Based on currently valid route parameter values for current candidate route being evaluated, manager system 110 can apply query data to predictive model 1004 for a certain user and predictive model 1004 can output a predicted route compliance rating for the particular candidate route being evaluated. Manager system 110 can then use the predicted route compliance rating biasing values of a baseline location probability decision tree accessed from data repository 108 at block 4004. Referring again to the location probability decision tree of FIG. 6, manager system 110, where the user at location A is currently being guided, can bias values of the probability decision tree in dependence on whether the remaining users currently being guided by prompting data and also in dependence on the predicted route compliance rating of the remaining user determined with use of predictive model 1004. Thus, if a certain remaining user is being guided to travel along the route A to C to D, and the respective remaining user has an above baseline route compliance rating as determined with use of predictive model 1004, manager system 110 can bias edge values connecting nodes A and C and nodes C and D in favor of the user actually performing the route A-C-D. If querying of predictive model 1004 indicates a predictive route compliance rating of the remaining user below a threshold rating, manager system 110 can elect to use the baseline probabilities indicated in the baseline location probability decision tree of FIG. 6.

Agent user employees Ei are equipped with an advanced smart Cart (ECi). Both ECi and CCj are equipped with a positioning tag and a screen that shows the layout of the store. ECi also includes means for guiding the employee to the next best item from a social distancing point of view (e.g. visual or audio means). ECi further includes means for recognizing fetched items (e.g. code scanner). Manager system 110 acquires at regular points in time Tk=T0+k*θ the agent user employee and customer user positions, EPi and CPj. Manager system 110 reads the positions broadcasted by the smart cart ECi and CCj position tags. Manager system 110 reads positioning information from further localization means, e.g. a video monitoring system, for better accuracy and integration of persons without a cart. Manager system 110 knows the map of the shop (as a collection of positions with neighboring data) and where each item is positioned (P(ITEM)).

Manager system 110 can determine, for each pair of positions (Pa,Pb), a list of routes R(Pa,Pb,r). If we define L(r) as the length of route r, the list R(Pa,Pb,r) is ordered so that $L(r) \leq L(r+1)$. Manager system 110 decomposes each route R(Pa,Pb,r) as an ordered sequence of positions RP(Pa, Pb,r,x).

Manager system 110 can include an optimization engine (OE). Data used by OE includes: All SLi; Shop topology; Items location; All EPi; All CPj. Determines Pick And Route Information (PARI): for each agent user Ei the next item ITEMi of SLi to pick up and the route to follow, corresponding to a sequence of route positions {RPi,x}. PARI are broadcasted in the store and received by all the agent users ECi. Each ECi extracts from PARI the information directed to Ei and presents it on a dedicated UI embarked in ECi. In one embodiment, OE of manager system 110 uses aisles width data included in the store topology for additional degrees of freedom in distancing management. In one embodiment, OE of manager system 110 uses topology data and presence count for also governing the number of people allowed simultaneously in the store.

The Optimization Engine (OE) of manager system 110, which can be provided in accordance with route selection process 112 works with the following assumptions: Each route R(Pa,Pb,r) is an ordered sequence of positions RP(Pa, Pb,r,x) with $0 \leq x \leq r$, RP(Pa,Pb,r,0)=Pa, RP(Pa,Pb,r,r)=Pb. In one embodiment, each position is accompanied by the width of the aisle at that position, which then gives us RP(Pa,Pb, r,x,w).

In one embodiment, all Ei and all Cj, when moving, are doing so at similar overall speeds, moving from RP(Pa,Pb, r,x) to RP(Pa,Pb,r,x+1) in an average time θE or θC. OE is triggered to refresh the current PARI: At regular time intervals T; In one embodiment, T is aligned to the localization system acquisition interval Tk=T0+k*θ. Each time an agent user Ei (or another user depending on the setup) scans an item, meaning they are requiring instructions on the next item to fetch and the route to follow.

The OE or manager system 110 works as follows: data refresh: refresh positions data for agent user employees and patron user customers: receive all current locations EPi & CPj of agent users and patron users from the localization functions. Refresh shopping lists: receive all current SLi that are up for fulfilment, from the ordering function. Determination of probabilities of encounters: For each agent user Ei with ITEMi undefined, assess, for each ITEMi on SLi, the probability pr to cross someone on each of the possible routes R(Pa,Pb,r) to ITEM. Encounter probability is inferred from the expected location changes of all EPi and CPj during the time it would take for Ei to reach ITEMi. Embodiments herein recognize that agent user EPi positions are predictable based on the route instructions dispatched by CS to each Ei.

Embodiments herein recognize that the future locations CPj of patron users without associated known item acquisition lists can be predicted based on movement direction probabilities. In a simple embodiment, movement direction probability is basic, e.g., CPj located in an aisle has two possible directions to move to and a probability of 0.5 for each direction; In a more advanced embodiment, movement direction probability takes additional parameters into account, e.g. short term history of movements, duration of absence of movement. A probability is determined for each position RP(Pa,Pb,r,x,w), resulting in a list RP(Pa,Pb,r,x, px).

Based on RP(Pa,Pb,r,x,px), an aggregated encounter probability which can be expressed as a predicted crossings count can be determined for each candidate route and gives R(Pa,Pb,r,pr). Item and route selection: For each agent user Ei, identify the item ITEMi and route that optimally minimize pr and r in R(EPi,P(ITEMi),r,pr).

Priority can be given to minimization of pr and then to minimization of r. A natural correlation of r and pr can be expected, as encounter probability would tend to be smaller as the travel distance gets smaller. This function yields an identified optimal next item ITEMi and an optimal route to it for Ei, OR(Epi,P(ITEMi),r). PARI building: Build a structured datagram specifying to the Ei: ITEMi and OR(EPi,P (ITEMi),r).

There is set forth herein an apparatus, system, and method for employee social distancing in a venue by which: manager system 110 continuously assesses and manages the encounter probability situation for agent user employees moving in a venue for fulfilling orders from patron user customers who are using the drive-in and home delivery services. Manager system 110 can factor in patron user customers in those cases where agent user employees and patron user customers share one same venue, e.g., store space. In an alternate embodiment, the solution factors in also the store personnel that refills the shelves; said personnel uses a variance of the Advanced Smart Cart and is modelled with specific attributes, e.g., specific movement speed. Shopping carts can be enhanced by: basic level apparatus that informs the user on presence around; advanced level that actively guides the user to the next optimal shopping item from a distancing point of view.

Embodiments herein recognize that the coronavirus pandemic has highlighted a priority for physical distancing. While staying at home is the preferred measure, people do need to leave their homes for certain priority purposes. Groceries shopping is a typical example of such purpose. Embodiments herein can be useful in helping customer users inside a venue such as a shop keep their distances with each other. Embodiments herein recognize that in the absence of a pandemic, a symmetrical use case does exist, where people might want to maximize the probability of running into people they know while traversing a venue.

Embodiments herein recognize that as a user enters a venue, their item acquisition, e.g., shopping list, is read into the venue's analysis system. Said system can constantly analyze all item acquisition lists currently active in the venue. Each time a user has collected an item from their list, they are presented the item in their list that is the next best to fetch from a collective standpoint.

Embodiments herein can take multiple factors into account to orchestrate all the individual shopping trajectories, e.g.: overall shop capacity: use the shopping lists analysis to determine when the next clients queuing outside may be allowed in, and how many of them; over-the-counter stations: automated ticket generation so that only one person at a time is present at the station; trajectories: favor trajectories where people would walk in the same direction rather than cross each other, as that has been found to help prevent coronavirus transmission. According to one embodiment, data repository 108 can store the following:

(A) List of Users: each user $U_i$ corresponds to a client wishing to enter the store, i varying from 1 to n (B) Shopping Lists: each user $U_i$ defines the list $ShL(U_i)$ with contains the list of items he/she plans to purchase into the store. The list can include a specific item, or just an item category: $ShL(U_i)=\{I_k\}U\{C_k\}$, k varying from 1 to Len(ShL$(U_i)$)

(C) User Trajectory: a user trajectory $UT(U_i)$ is defined by an itinerary, including an ordered sequence of locations (corresponding to items or categories) to go through, $UT(U_i)=\{I_{seq(k)}\}U\{CS_{eq(k)}\}$ (D) Item Categories List: defines the list of all categories C. of items within the store. E.g 'milk' would be a generic category. An item category is characterized by a geographical zone within the store (E) Items List: defines the full of items I* which can be purchased into the store. An item falls into (at least) one category. E.g. a specific item reference of milk. An item is characterized by a precise location within the store. Each item I* also has a stock level S(I*) (number of same items available in the shelf)

(F) Store Department List: defines the list of all the departments D within the store. Contains a list of items that are sold into the department. A store department is characterized by a precise geographical location within the store.

(G) List of Employees: defines the list of store employees $E_j$ who perform shelf replenishment within the store, j varying from 1 to m (H) Replenishment List: $R(E_j)=\{I_k\}$ defines the ordered list of items (and the number of each item) that employee $E_j$ will use to replenish the shelf. As this list is ordered, it also serve as an employee trajectory, similar to the user trajectory.

Embodiments herein can include taking in as input all the shopping lists from all the users. Items stock levels. Items information (category, department, geolocation). Precise plan of the store. Embodiments herein can optimize both patron users' and agent user employees' trajectories. Embodiments herein can include outputs that include: (i) suggested user trajectories, (ii) suggested replenishment list and employee trajectory to perform the replenishment. A method herein can be executed iteratively and continuously, after any change in data input, such as: change in stock levels: a user has one (or more) items from a shelf. An employee has added more items to the shelf, change in shopping list: a user has changed something in its shopping list (added/removed an item, etc. . . . )

Various available tools, libraries, and/or services can be utilized for implementation of predictive model 1002 and/or predictive model 1004. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM®

WATSON® can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. Training predictive model 1002 and/or predictive model 1004 can include use of, e.g., support vector machines (SVM), Bayesian networks, neural networks and/or other machine learning technologies.

In another aspect manager system 110 can be in communication with a social media system 170 which can be used by manager system 110 to obtain data on users on being granted permission from such users. Social media system 170 can include a collection of files, including for example, HTML files, CSS files, image files, and JavaScript files. Social media system 170 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 170. On being registered, manager system 110 can examine data of social media system 170, e.g., to determine whether first and second users are in communication with one another via a messaging system of social media system 170. A user can enter registration data using a user interface displayed on a client computer device of UE devices 120A-120Z. Entered registration data can include e g name, address, social media account information, other contact information, biographical information, background information, preferences information, and/or permissions data e.g. can include permissions data allowing manager system 110 to query data of a social media account of a user provided by social media system 170 including messaging system data and any other data of the user. When a user opts-in to register into system 100 and grants system 100 permission to access data of social media system 170, system 100 can inform the user as to what data is collected and why, that any collected personal data may be encrypted, that the user can opt out at any time, and that if the user opts out, any personal data of the user is deleted.

Manager system 110, in one embodiment, can be in communication with a geo classification system 180 that can associate venues to spatial coordinate ranges associated to the venues. The geo classification system can include enhanced spatial maps pre-marked with tags to indicate uses associated with map features. Map features can include venues having associated venue areas including venue building areas and/or associated venue parking areas. An enhanced map can include tag specifying usage classifications of venues, e.g., residential, business, public and the like. An enhanced map can be tagged to tag features of a map including e.g. roads, bodies of water and infrastructure features such as building walls (exterior and interior) defining enterprise venues. In some cases, an enhanced map can be tagged so that that different parts of a building are tagged differently, e.g. a doorway can be tagged differently from a conference room. The geo classification system can provide data tags associated to locations that specify uses associated with various locations. The geo classification system can cognitively map venues identified by venue identifiers, e.g. names, addresses, classifications, and the like, to coordinate location ranges associated to the various venues. Accordingly, manager system 110 querying the geo classification system, with location data in the form of coordinate location data, can return an identifier venue. Further, the geo classification system can cognitively map venues that are listed in geoclassification system 180 with uses associated with such venues, e.g., whether such venues are for residential use or business use and include a variety of additional or alternative use classifications, e.g., public use, roadway use, waterway use, and the like. An enhanced map can be tagged to tag features of a map, including e.g., roads, bodies of water and venues. Venues can be provided e.g., by open spaces, such as developed open spaces or undeveloped open spaces, buildings such as open roof building or closed roof buildings, and/or open spaces associated to buildings, such as a building associated with a parking lot. For each venue, the geo classification system can associate e.g., identifiers for the venue, ranges and coordinate locations associated with the venue, features associated to the venue, such as building infrastructure features, parking lot features, and other features. The described geo classification system, according to one embodiment, can be provided by GOOGLE MAPS® (GOOGLE MAPS® is a registered trademark of Google, Inc.).

Figure 12:
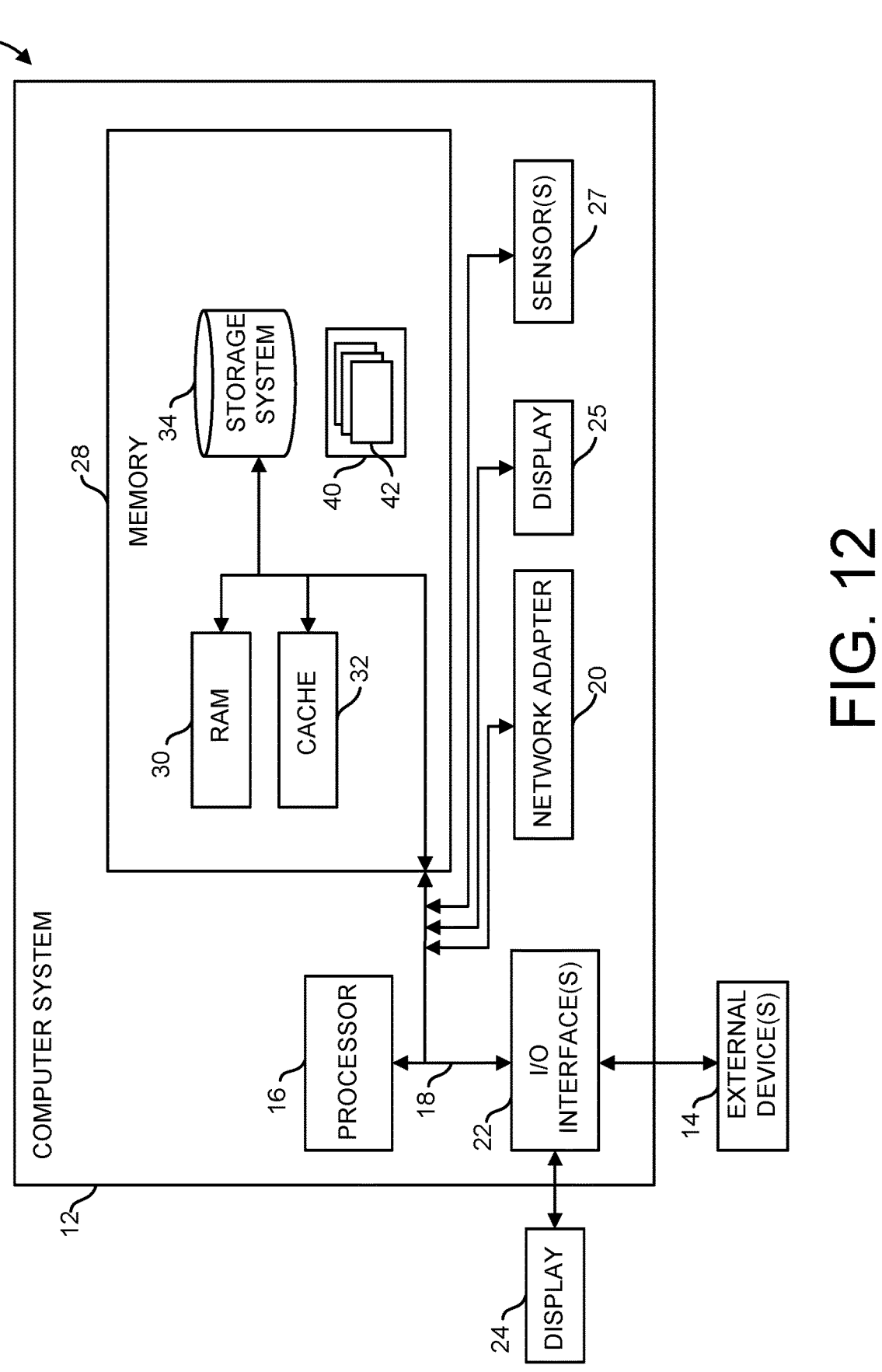
FIG. 12 depicts a computing node according to one embodiment.
Figure 13:
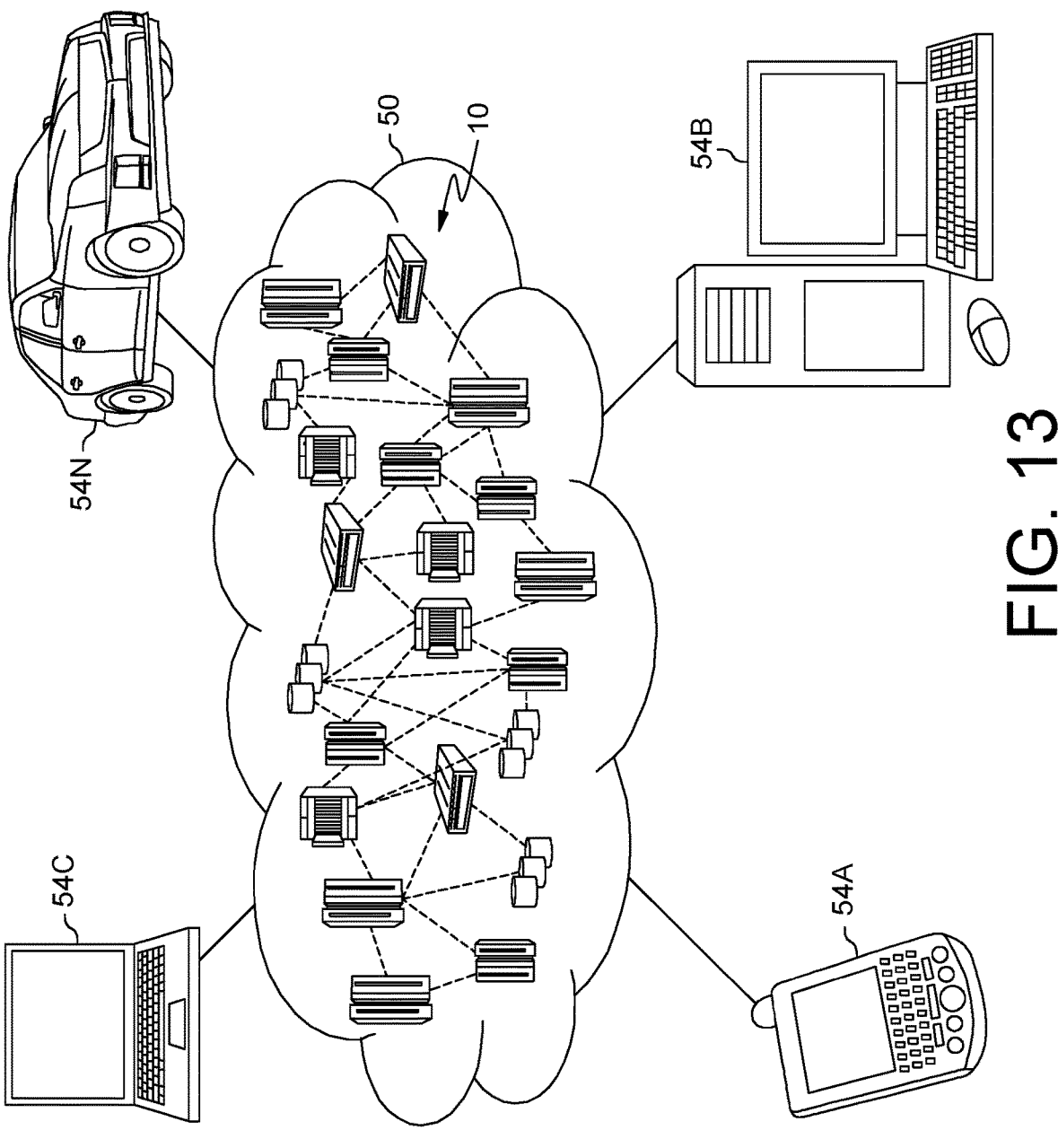
FIG. 13 depicts a cloud computing environment according to one embodiment.
Figure 14:
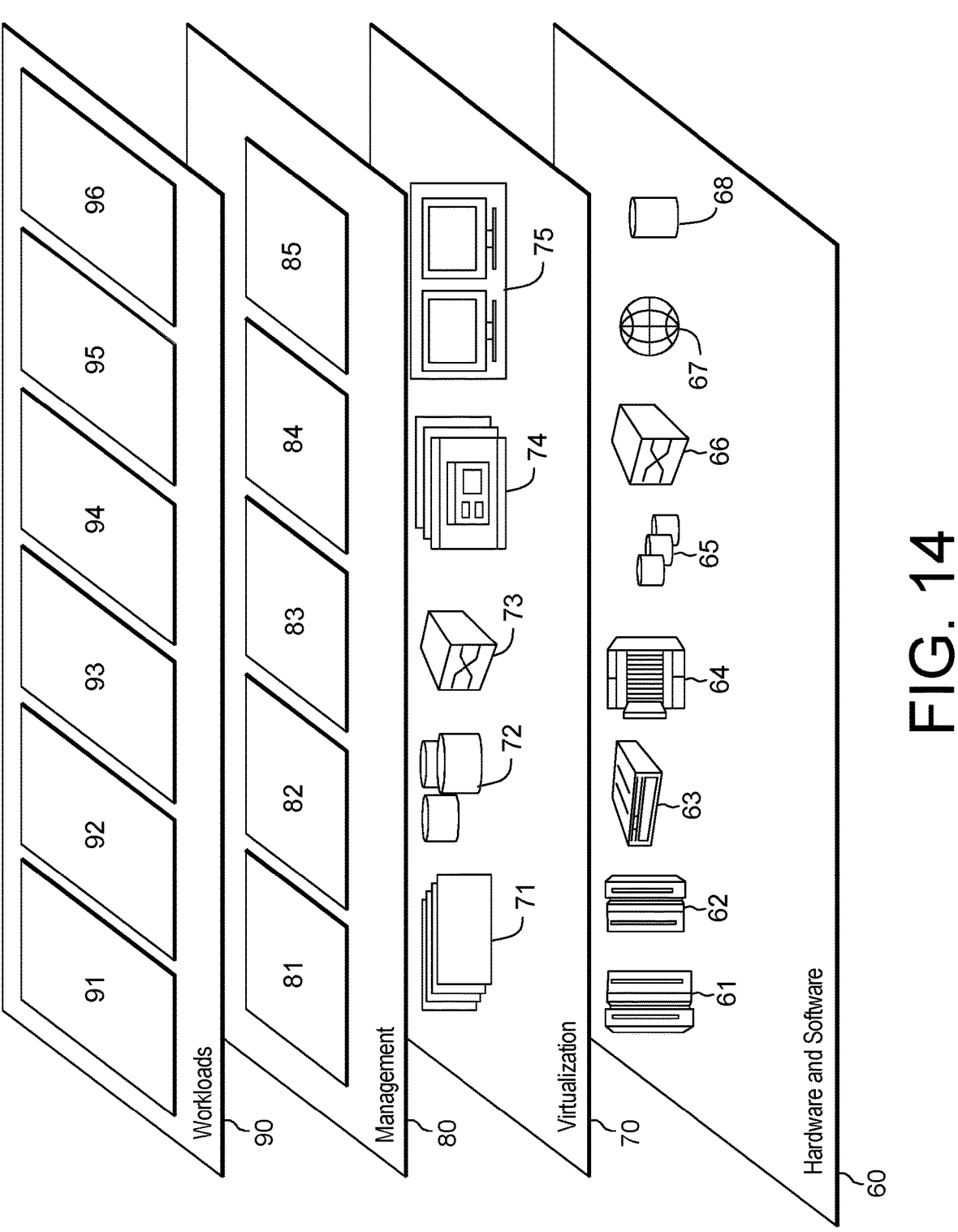
FIG. 14 depicts abstraction model layers according to one embodiment.

Certain embodiments herein may offer various technical computing advantages and practical applications involving computing advantages to address problems arriving in the realm of computer networks and computer systems. Embodiments herein provide multiuser enhanced user interface functionalities so that a plurality of users within a venue are simultaneously guided with use of prompting data presented on respective UE devices of the respective users to avoid crossings with other users. Embodiments herein include features to iteratively refresh location data so that recent location data of respective users within a venue is iteratively collected and referenced in the return of a plurality of action decisions made respectively for different users in an environment. Embodiments herein can include evaluating possible routes which might be engaged in by a respective user and intelligently filtering out a subset of possible routes and the generation of a limited set of candidate routes for evaluation which thus reduces consumption of computing resources. Embodiments herein provide enhanced user interface functionality for a plurality of interoperating users sharing a common physical venue environment. The enhanced user interface functionality includes features to passively detect locations of various users and apply passively detected locations as inputs into user interface resulting in particular prompts being presented to respective users of a system. A fundamental aspect of operation of a computer system is its interoperation to which it operates including human actors. Various decision data structures can be used to drive artificial intelligence (AI) decision making Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making Embodiments herein can include particular arrangements for both collecting rich data into a data repository and additional particular arrangements for updating such data and for use of that data to drive artificial intelligence decision making Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 12-14 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCS, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 12, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 13-14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 2 and FIG. 4. In one embodiment, one or more UE device 120A-120Z can include one or more computing node 10 and can include one or more program 40 for performing functions described with reference to one or more UE device 120-120Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 13 computing node 10 is described as being implemented in a cloud computing environment and accordingly is referred to as a cloud computing node in the context of FIG. 13.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for selecting routes optimized for social distancing as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining location data that specifies respective locations of a plurality of users in a venue, wherein the plurality of users include first through Nth users within the venue, wherein the first through Nth users include at least a first user and a second user;

examining an item acquisition list for the first user, wherein the item acquisition list specifies items for acquisition by the first user that are distributed into different locations of the venue;

generating a plurality of candidate routes for the first user commencing from a current location of the first user, wherein the plurality of candidate routes include one or more candidate route commencing from the current location of the first user to a first item referred on the item acquisition list, and one or more candidate route commencing from the current location of the first user to a second item referred on the item acquisition list;

evaluating respective ones of the plurality of candidate routes using multiple factors, wherein the multiple factors include a crossing avoidance factor and a speed factor, the crossing avoidance factor, for a respective candidate route of the plurality of candidate routes, being in dependence on a predicted likelihood of the first user crossing one or more user of second to Nth users of the first though Nth users while traveling the respective candidate route, the speed factor being in dependence on a predicted speed of the first user in traveling the respective candidate route, wherein the evaluating includes accessing, from a data repository, a location probability decision tree for a current location of the second user, wherein the location probability decision tree has arrival time values of the second user populated therein based at least in part on historical data of the second user, wherein arrival time values of the second user that have been populated within the accessed location probability decision tree include arrival time values based on a determined guidability rating of the second user, wherein the guidability rating of the second user is determined by querying a machine learning model that has been trained with training data specifying historical instances of the second user being guided and associated route compliance of the second user in respect to the historical instances of the second user being guided;

selecting one of the plurality of candidate routes as the current route of the first user in dependence on the evaluating; and prompting the first user to travel the current route selected by the selecting, wherein the first user responsively to the prompting is guided by the prompting to a destination of the current route selected by the selecting.

2. The computer implemented method of claim 1, wherein the evaluating a first candidate route of the plurality of candidate routes using multiple factors includes accessing from a data repository a location probability decision tree for the current location of a second user of the plurality of users, and identifying prospective crossings of the first user and the second user with use of the location probability decision tree, wherein the identifying includes comparing subsequent locations of a first user specified on first candidate route to possible future locations of the second user specified on the location probability decision tree.

3. The computer implemented method of claim 1, wherein the evaluating a first candidate route of the plurality of candidate routes using multiple factors includes accessing from a data repository a location probability decision tree for the current location of a second user of the plurality of users.

4. The computer implemented method of claim 1, wherein the evaluating a first candidate route of the plurality of candidate routes using multiple factors includes accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified on first candidate route to possible future locations of the second user specified on the location probability decision tree.

5. The computer implemented method of claim 1, wherein the evaluating a first candidate route of the plurality of candidate routes using multiple factors includes accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified on first candidate route to possible future locations of the second user specified on the location probability decision tree, wherein the customizing includes querying a predictive model that predicts a speed of travel of the second user, wherein predictive model has been trained with training data that specifies instances of travel of the second user within a venue and additional venues external to the venue.

6. The computer implemented method of claim 1, wherein the evaluating a first candidate route of the plurality of candidate routes using multiple factors includes accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified by the first candidate route to possible future locations of the second user specified on the location probability decision tree, wherein the customizing includes querying a predictive model that predicts a speed of travel of the second user, wherein the predictive model has been trained with training data that specifies instances of travel of the second user within the venue and within additional venues external to the venue, wherein the method includes during the prompting recording subsequent location data specifying actual locations achieved by second user during the prompting, re-training the predictive model with training data provided by the subsequent location data, querying the re-trained predictive model, and selecting a subsequent route for the first user based on a result of the querying the re-trained predictive model.

7. The computer implemented method of claim 1, wherein the method includes examining a second item acquisition list for the second user, wherein the second item acquisition list specifies items for acquisition by the second user that are distributed into different locations of the venue; generating a second plurality of candidate routes for the second user commencing from a current location of the second user, wherein the second plurality of candidate routes include one or more candidate route commencing from the current location of the second user to a first item referred on the second item acquisition list, and one or more candidate route commencing from the current location of the second user to a second item referred on the second item acquisition list; evaluating respective ones of the second plurality candidate routes using multiple factors, wherein the multiple factors include a crossing avoidance factor and a speed factor, the crossing avoidance factor, for a respective candidate route of the second plurality of candidate routes, being in dependence on a predicted likelihood of the second user crossing one or more user of second to Nth users of the first though Nth user while traveling the respective candidate route, the speed factor being in dependence on a predicted speed of the second user in traveling the respective candidate route; and selecting one of the second plurality of candidate routes as the current route of the second user in dependence on the evaluating.

8. The computer implemented method of claim 1, wherein the method includes examining a second item acquisition list for the second user, wherein the second item acquisition list specifies items for acquisition by the second user that are distributed into different locations of the venue; generating a second plurality of candidate routes for the second user commencing from a current location of the second user, wherein the second plurality of candidate routes include one or more candidate route commencing from the current location of the second user to a first item referred on the second item acquisition list, and one or more candidate route commencing from the current location of the second user to a second item referred on the second item acquisition list; evaluating respective ones of the second plurality candidate routes using multiple factors, wherein the multiple factors include a crossing avoidance factor and a speed factor, the crossing avoidance factor, for a respective candidate route of the second plurality of candidate routes, being in dependence on a predicted likelihood of the second user crossing one or more user of the first to Nth users while traveling the respective candidate route, the predicted likelihood of the second user crossing one or more user of the first to Nth users while traveling the respective candidate route being in dependence on map data stored in a data repository that indicates an aisle width of an aisle associated to an identified prospective crossing between the second user and another user by the second user traveling the respective candidate route, the speed factor being in dependence on a predicted speed of the second user in traveling the respective candidate route; selecting one of the second plurality of candidate routes as the current route of the second user in dependence on the evaluating; and prompting the first user to travel the current route selected by the selecting.

9. The computer implemented method of claim 1, wherein the method includes examining a second item acquisition list for the second user, wherein the second item acquisition list specifies items for acquisition by the second user that are distributed into different locations of the venue; generating a second plurality of candidate routes for the second user commencing from a current location of the second user, wherein the second plurality of candidate routes include one or more candidate route commencing from the current location of the second user to a first item referred on the second item acquisition list, and one or more candidate route commencing from the current location of the second user to a second item referred on the second item acquisition list; evaluating respective ones of the second plurality candidate routes using multiple factors, wherein the multiple factors include a crossing avoidance factor and a speed factor, the crossing avoidance factor, for a respective candidate route of the second plurality of candidate routes, being in dependence on a predicted likelihood of the second user crossing one or more user of the first to Nth users while traveling the respective candidate route, the predicted likelihood of the second user crossing one or more user of the first to Nth users while traveling the respective candidate route being in dependence on map data stored in a data repository that indicates an aisle width of an aisle associated to an identified prospective crossing between the second user and another user by the second user traveling the respective candidate route, the speed factor being in dependence on a predicted speed of the second user in traveling the respective candidate route; and selecting one of the second plurality of candidate routes as the current route of the second user in dependence on the evaluating.

10. The computer implemented method of claim 1, wherein the evaluating a first candidate route of the plurality candidate routes using multiple factors includes accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified by the first candidate route to possible future locations of the second user specified on the location probability decision tree, wherein the customizing includes querying a predictive model that predicts a speed of travel of the second user, wherein the predictive model has been trained with training data that specifies instances of travel of the second user within the venue and within additional venues external to the venue, wherein the method includes during the prompting recording subsequent location data specifying actual locations achieved by second user during the prompting, re-training the predictive model with training data provided by the subsequent location data, querying the re-trained predictive model, and selecting a subsequent route for the first user based on a result of the querying the re-trained predictive model, wherein the method includes examining a second item acquisition list for the second user, wherein the second item acquisition list specifies items for acquisition by the second user that are distributed into different locations of the venue; generating a second plurality of candidate routes for the second user commencing from a current location of the second user, wherein the second plurality of candidate routes include one or more candidate route commencing from the current location of the second user to a first item referred on the second item acquisition list, and one or more candidate route commencing from the current location of the second user to a second item referred on the second item acquisition list; evaluating respective ones of the second plurality candidate routes using multiple factors, wherein the multiple factors include a crossing avoidance factor and a speed factor, the crossing avoidance factor, for a respective candidate route of the second plurality of candidate routes, being in dependence on a predicted likelihood of the second user crossing one or more user of second to Nth users of the first though Nth user while traveling the respective candidate route, the speed factor being in dependence on a predicted speed of the second user in traveling the respective candidate route; and selecting one of the second plurality of candidate routes as the current route of the second user in dependence on the evaluating.

11. The computer implemented method of claim 1, wherein the system for the evaluating is configured to perform (a) ascertaining whether the first user and the second user are predicted to cross one another while traveling in a common direction, (b) determining whether the first user and the second user are predicted to cross one another while traveling in opposite directions, and wherein the selecting is performed in dependence on a result of the ascertaining and the determining.

12. The computer implemented method of claim 1, wherein the second user is an unguided user who is not being guided by a system that is guiding the first user, and who is not in communication with the system that is guiding the first user, wherein the method includes determining that the second user is an unguided user who is not being guided by the system, wherein the evaluating a first candidate route of the plurality candidate routes using multiple factors includes, responsively to the determining that the second user is an unguided user who is not being guided by the system, accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified on first candidate route to possible future locations of the second user specified on the location probability decision tree.

13. A system comprising:
a memory;
at least one processor in communication with the memory; and
program instructions executable by one or more processor via the memory to perform a method comprising:
examining location data that specifies respective locations of a plurality of users in a venue, wherein the plurality of users include first through Nth users within the venue, wherein the first through Nth users include at least a first user and a second user;
examining an item acquisition list for the first user, wherein the item acquisition list specifies items for acquisition by the first user that are distributed into different locations of the venue;
generating a plurality of candidate routes for the first user commencing from a current location of the first user, wherein the plurality of candidate routes include one or more candidate route commencing from the current location of the first user to a first item referred on the item acquisition list, and one or more candidate route commencing from the current location of the first user to a second item referred on the item acquisition list;
evaluating respective ones of the plurality candidate routes using multiple factors, wherein the multiple factors include a crossing avoidance factor and a speed factor, the crossing avoidance factor, for a respective candidate route of the plurality of candidate routes, being in dependence on a predicted likelihood of the first user crossing one or more user of second to Nth users of the first though Nth users while traveling the respective candidate route, the speed factor being in dependence on a predicted speed of the first user in traveling the respective candidate route, wherein the evaluating includes identifying prospective crossings of the first user and the second user of the first to Nth users, wherein the identifying the prospective crossings of the first user and a second user of the first to Nth users includes accessing a location probability tree from a data repository for the second user responsively to ascertaining that the second user is not a guided user being guided by an item acquisition list, populating arrival time values of the second user within the accessed location probability tree based on historical data of the second user, generating a first candidate route for the first user in dependence on user item acquisition list of the first user, and comparing a subsequent location of the first user specified on a first candidate route to a possible future location of the second user specified on the location probability decision tree for the second user, wherein the comparing includes comparing a predicted time of arrival of the first user at the subsequent location to a predicted arrival time of the second user at the possible future location, and wherein determining the predicted arrival time of the second user at the possible future location is dependent on an arrival time value of the arrival time values of the second user that have been populated within the accessed location probability tree of the second user, wherein the evaluating the first candidate route of the plurality candidate routes using multiple factors includes accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified on first candidate route to possible future locations of the second user specified on the location probability decision tree, wherein the customizing includes querying a predictive model that predicts a speed of travel of the second user, wherein the predictive model has been trained with training data that specifies instances of travel of the second user within the venues and additional venues external to the venue;

selecting one of the plurality of candidate routes as the current route of the first user in dependence on the evaluating; and prompting the first user to travel the current route selected by the selecting, wherein the first user responsively to the prompting is guided by the prompting to a destination of the current route selected by the selecting, wherein the method includes during the prompting recording subsequent locations data specifying actual locations achieved by second user during the prompting, re-training the predictive model with training data provided by the subsequent location data, querying the re-trained predictive model, and selecting a subsequent route for the first user based on a result of the querying the re-trained predictive model.

14. The system of claim 13, wherein the system includes a first UE device of the first user disposed on a first cart in the venue and a second UE device of the second user disposed on a second cart in the venue, and a third UE device of a third user, wherein the first UE device has installed thereon installation code facilitating presentment of promoting data for prompting the first user on the first UE device, wherein the third UE device has installed thereon installation code facilitating presentment of prompting data for prompting the third user on the third UE device, wherein the populating arrival time values of second user within the accessed location probability tree based on historical data of the second user includes populating arrival time values of second user within nodes of the accessed location probability tree based on historical data of the second user, wherein the method includes detecting that a certain item of the item acquisition list of the first user has been placed in the first cart and responsively to the detecting performing the generating, wherein the prompting the first user to travel the current route selected by the selecting includes sending prompting data for presentment on the first UE device for a time that the first user travels the current route and wherein the first user responsively to the prompting data presented on the first UE device for the time that the first user travels the current route is guided to a destination of the current route selected by the selecting, wherein during the time the first user travels the current route, producing a multiple candidate routes for the third user commencing from a current location of the third user, wherein the multiple candidate routes include one or more candidate route commencing from the current location of the third user to a first item referred on an item acquisition list of the third user, and one or more candidate route commencing from the current location of the third user to a second item referred on the item acquisition list of the third user, wherein the producing is based on location data of the first, second and third user captured later in time than location data of the first, second and third user captured on which the generating is based, wherein the second user is an unguided user who is not being guided by a system that is guiding the first user, and who is not in communication with the system that is guiding the first user, wherein the method includes determining that the second user is an unguided user who is not being guided by the system, wherein the evaluating a first candidate route of the plurality candidate routes using multiple factors includes, responsively to the determining that the second user is an unguided user who is not being guided by the system, accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified on first candidate route to possible future locations of the second user specified on the location probability decision tree, wherein the third user is a guided user who is being guided by a system that is guiding the first user, and who is in communication with the system that is guiding the first user, wherein the evaluating a first candidate route of the plurality candidate routes using multiple factors includes, responsively to the determining that the third user is a guided user who is being guided by the system, predicting subsequent location of the third user using the item acquisition list of the third user, wherein training of the predictive model that has been trained with training data that specifies instances of travel of the second user has included training of the predictive model with training data that specifies historical in venue hop sequences of the second user and travel times associated to such hop sequences, wherein arrival time values of second user that have been populated within the accessed location probability tree of the second user include arrival time values based on a determined guidability rating of the second user, wherein the guidability rating of the second user is determined by query of a machine learning model that has been trained with training data that specifies historical instances of the second user being guided, and associated route compliance of the second user in respect to the historical instances of the second user being guided, wherein the speed factor is determined in dependence on an assessment of the respective ones of the candidate routes generated by the generating with reference to an identified optimized overall course, the identified optimized overall course determined by subjecting the item acquisition list of the first user to analysis by an optimization solver.

15. A system comprising:

a memory;

at least one processor in communication with the memory; and program instructions executable by one or more processor via the memory to perform a method comprising:

examining location data that specifies respective locations of a plurality of users in a venue, wherein the plurality of users include first through Nth users within the venue, wherein the first through Nth users include at least a first user and a second user;

examining an item acquisition list for the first user, wherein the item acquisition list specifies items for acquisition by the first user that are distributed into different locations of the venue;

generating a plurality of candidate routes for the first user commencing from a current location of the first user, wherein the plurality of candidate routes include one or more candidate route commencing from the current location of the first user to a first item referred on the item acquisition list, and one or more candidate route commencing from the current location of the first user to a second item referred on the item acquisition list;

evaluating respective ones of the plurality candidate routes using multiple factors, wherein the multiple factors include a crossing avoidance factor and a speed factor, the crossing avoidance factor, for a respective candidate route of the plurality of candidate routes, being in dependence on a predicted likelihood of the first user crossing one or more user of second to Nth users of the first though Nth users while traveling the respective candidate route, the speed factor being in dependence on a predicted speed of the first user in traveling the respective candidate route, wherein the evaluating includes identifying prospective crossings of the first user and a second user of the first to Nth users, wherein the identifying the prospective crossings of the first user and a second user of the first to Nth users includes accessing a location probability tree from a data repository for the second user responsively to ascertaining that the second user is not a guided user being guided by an item acquisition list, populating arrival time values of second user within the accessed location probability tree based on historical data of the second user, generating a first candidate route for the first user in dependence on user item acquisition list of the first user, and comparing a subsequent location of the first user specified on a first candidate route to a possible future location of the second user specified on the location probability decision tree for the second user, wherein the comparing includes comparing a predicted time of arrival of the first user at the subsequent location to a predicted arrival time of the second user at the possible future location, and wherein determining the predicted arrival time of the second user at the possible future location is dependent on an arrival time value of the arrival time values of second user that have been populated within the accessed location probability tree of the second user;

selecting one of the plurality of candidate routes as the current route of the first user in dependence on the evaluating; and prompting the first user to travel the current route selected by the selecting, wherein the first user responsively to the prompting is guided by the prompting to a destination of the current route selected by the selecting.

16. The system of claim 15, wherein the evaluating the first candidate route of the plurality candidate routes using multiple factors includes accessing from a data repository a location probability decision tree for the current location of a second user of the plurality of users, customizing the location probability decision tree for the current location based on historical data of the second user and identifying prospective crossings of the first user and the second user with use of the location probability decision tree, wherein the identifying includes comparing subsequent locations of a first user specified on first candidate route to possible future locations of the second user specified on the location probability decision tree.

17. The system of claim 15, wherein the method includes scoring, with use of an optimization solver, candidate courses of travel for acquisition of all item items listed on the item acquisition list of the first user and qualifying the first candidate route for consideration in the comparing in dependence on a result of the scoring.

* * * * *